United States Patent
Gonzalez et al.

(10) Patent No.: US 11,175,924 B2
(45) Date of Patent: *Nov. 16, 2021

(54) LOAD-STORE UNIT WITH PARTITIONED REORDER QUEUES WITH SINGLE CAM PORT

(71) Applicant: INTERNATIONAL BUSINESS MACHINES CORPORATION, Armonk, NY (US)

(72) Inventors: Christopher J. Gonzalez, Shelburne, VT (US); Bryan Lloyd, Austin, TX (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,627

(22) Filed: Oct. 6, 2017

(65) Prior Publication Data

US 2019/0108032 A1    Apr. 11, 2019

(51) Int. Cl.
*G06F 9/38* (2018.01)

(52) U.S. Cl.
CPC .......... *G06F 9/3851* (2013.01); *G06F 9/3855* (2013.01); *G06F 9/3867* (2013.01)

(58) Field of Classification Search
CPC ..... G06F 9/3836; G06F 9/3851; G06F 9/3855
See application file for complete search history.

(56) References Cited

U.S. PATENT DOCUMENTS

| 4,785,398 A | 1/1988 | Joyce et al. |
| 4,731,739 A | 3/1988 | Woffinden et al. |
| (Continued) |

FOREIGN PATENT DOCUMENTS

| CN | 101324840 A | 12/2008 |
| CN | 103198028 A | 7/2013 |
| (Continued) |

OTHER PUBLICATIONS

Bryan Lloyd et al. "Address Translation for Sending Real Address to Memory Subsystem in Effective Address Based Load-Store Unit", U.S. Appl. No. 15/825,323, filed Nov. 29, 2017.

(Continued)

*Primary Examiner* — Jacob Petranek
(74) *Attorney, Agent, or Firm* — Cantor Colburn LLP; Teddi Maranzano

(57) ABSTRACT

Technical solutions are described for a load-store unit (LSU) that executes a plurality of instructions in an out-of-order (OoO) window using multiple LSU pipes. The execution includes selecting an instruction from the OoO window, the instruction using an effective address; and if the instruction is a load instruction: and if the processing unit is operating in single thread mode, creating an entry in a first partition of a load reorder queue (LRQ) if the instruction is issued on a first load pipe, and creating the entry in a second partition of the LRQ if the instruction is issued on a second load pipe. Further, if the processing unit is operating in a multi-thread mode, creating the entry in a first predetermined portion of the first partition of the LRQ if the instruction is issued on the first load pipe and by a first thread of the processing unit.

13 Claims, 14 Drawing Sheets

(56) References Cited

U.S. PATENT DOCUMENTS

| | | | |
|---|---|---|---|
| 5,465,337 A * | 11/1995 | Kong | G06F 12/1027 |
| | | | 711/206 |
| 5,604,879 A | 12/1997 | Beavers | |
| 5,867,644 A | 2/1999 | Ranson et al. | |
| 6,021,485 A | 2/2000 | Feiste et al. | |
| 6,055,622 A | 4/2000 | Spillinger | |
| 6,141,747 A | 10/2000 | Witt | |
| 6,266,768 B1 | 7/2001 | Frederick, Jr. et al. | |
| 6,477,635 B1 | 11/2002 | Kahle et al. | |
| 6,598,122 B2 | 7/2003 | Mukherjee et al. | |
| 6,640,293 B1 | 10/2003 | Paredes et al. | |
| 6,694,425 B1 * | 2/2004 | Eickemeyer | G06F 9/3851 |
| | | | 712/216 |
| 6,901,540 B1 | 5/2005 | Griffith, Jr. et al. | |
| 6,931,639 B1 * | 8/2005 | Eickemeyer | G06F 9/3802 |
| | | | 712/228 |
| 7,000,097 B2 | 2/2006 | Senter et al. | |
| 7,159,095 B2 | 1/2007 | Dale et al. | |
| 7,343,469 B1 | 3/2008 | Bogin et al. | |
| 7,350,051 B2 | 3/2008 | Hinojosa et al. | |
| 7,370,177 B2 | 5/2008 | Kalla | |
| 7,389,400 B2 | 6/2008 | Corrigan et al. | |
| 7,730,282 B2 | 6/2010 | Dieffenderfer | |
| 7,809,924 B2 | 10/2010 | Flood et al. | |
| 7,844,746 B2 | 11/2010 | Arimilli et al. | |
| 8,041,894 B2 | 10/2011 | Krumm et al. | |
| 8,041,928 B2 | 10/2011 | Burky et al. | |
| 8,099,566 B2 | 1/2012 | Luttrell | |
| 8,285,947 B2 | 10/2012 | Beaumont-Smith et al. | |
| 8,447,911 B2 | 5/2013 | Burger et al. | |
| 8,626,765 B2 | 1/2014 | Duan et al. | |
| 8,683,179 B2 | 3/2014 | Ramani et al. | |
| 8,707,011 B1 | 4/2014 | Glasco et al. | |
| 8,713,263 B2 | 4/2014 | Bryant | |
| 8,943,299 B2 | 1/2015 | Ekanadham et al. | |
| 9,069,563 B2 | 1/2015 | Konigsburg et al. | |
| 9,037,836 B2 | 5/2015 | McConnell | |
| 9,116,729 B2 | 8/2015 | Cooray et al. | |
| 9,135,184 B2 | 9/2015 | Swanberg | |
| 9,207,944 B1 * | 12/2015 | Laudon | G06F 9/3867 |
| 9,292,290 B2 | 3/2016 | Muff et al. | |
| 9,298,642 B2 | 3/2016 | Kagan et al. | |
| 9,317,443 B2 | 4/2016 | Bybell et al. | |
| 9,323,692 B2 | 4/2016 | Bybell et al. | |
| 9,335,999 B2 | 5/2016 | Kaplan et al. | |
| 9,448,936 B2 | 9/2016 | Goel et al. | |
| 9,535,695 B2 | 1/2017 | Mylius et al. | |
| 9,563,428 B2 | 2/2017 | Chen et al. | |
| 9,563,536 B1 | 2/2017 | Cooper | |
| 9,740,409 B2 | 8/2017 | Kanigicherla et al. | |
| 10,089,240 B2 * | 10/2018 | Sohi | G06F 12/0802 |
| 10,394,558 B2 | 8/2019 | Gonzalez et al. | |
| 2001/0014941 A1 | 8/2001 | Akkary | |
| 2004/0030867 A1 | 2/2004 | Arnold et al. | |
| 2004/0176942 A1 | 9/2004 | Chocia et al. | |
| 2005/0182912 A1 | 8/2005 | Dement et al. | |
| 2006/0031820 A1 | 2/2006 | Li | |
| 2006/0114132 A1 | 6/2006 | Zhang | |
| 2006/0259742 A1 | 11/2006 | Norden et al. | |
| 2007/0288725 A1 | 12/2007 | Luick | |
| 2008/0005533 A1 | 1/2008 | Altman et al. | |
| 2008/0162887 A1 | 7/2008 | Flood et al. | |
| 2008/0288759 A1 | 11/2008 | Gonion et al. | |
| 2009/0037697 A1 | 2/2009 | Ramani et al. | |
| 2009/0063823 A1 | 3/2009 | Burky | |
| 2009/0182973 A1 | 7/2009 | Greiner et al. | |
| 2010/0146209 A1 | 5/2010 | Burger et al. | |
| 2010/0161945 A1 | 6/2010 | Burky | |
| 2010/0262806 A1 | 10/2010 | Doing et al. | |
| 2010/0332805 A1 | 12/2010 | Allue et al. | |
| 2011/0231824 A1 | 9/2011 | Chabbi | |
| 2012/0221796 A1 * | 8/2012 | Tran | G06F 9/30043 |
| | | | 711/131 |
| 2013/0073833 A1 | 3/2013 | Konigsburg et al. | |
| 2013/0173886 A1 | 7/2013 | Dockser et al. | |
| 2013/0212585 A1 * | 8/2013 | Tran | G06F 9/30189 |
| | | | 718/102 |
| 2013/0311996 A1 | 11/2013 | Fetterman et al. | |
| 2013/0318330 A1 | 11/2013 | Alexander et al. | |
| 2013/0346729 A1 | 12/2013 | Barowski | |
| 2014/0115267 A1 | 4/2014 | Pierson et al. | |
| 2015/0095610 A1 * | 4/2015 | Ben-Meir | G06F 12/1036 |
| | | | 711/207 |
| 2015/0100765 A1 | 4/2015 | Abdallah | |
| 2015/0205605 A1 | 7/2015 | Abdallah | |
| 2015/0242212 A1 | 8/2015 | Sudhakar et al. | |
| 2015/0370695 A1 | 12/2015 | Koju | |
| 2016/0117173 A1 | 4/2016 | Chadha | |
| 2016/0117174 A1 | 4/2016 | Chadha et al. | |
| 2016/0154635 A1 | 6/2016 | Koju | |
| 2016/0188486 A1 | 6/2016 | Sohi et al. | |
| 2016/0202988 A1 | 7/2016 | Ayub et al. | |
| 2016/0202991 A1 | 7/2016 | Eisen et al. | |
| 2016/0323253 A1 | 11/2016 | Armritpal et al. | |
| 2017/0010973 A1 | 1/2017 | Mizrahi et al. | |
| 2017/0041220 A1 * | 2/2017 | Zhang | H04L 45/64 |
| 2017/0060755 A1 | 3/2017 | Chou | |
| 2017/0109166 A1 * | 4/2017 | Eisen | G06F 9/30072 |
| 2017/0139716 A1 | 5/2017 | Caulfield et al. | |
| 2017/0286296 A1 * | 10/2017 | Mukherjee | G06F 12/1063 |
| 2017/0364356 A1 * | 12/2017 | Ayub | G06F 9/30043 |
| 2018/0285101 A1 | 10/2018 | Yahav | |
| 2019/0227779 A1 | 7/2019 | Jaeger | |

FOREIGN PATENT DOCUMENTS

| | | | |
|---|---|---|---|
| CN | 104094223 A | | 10/2014 |
| GB | 2456621 A | | 7/2009 |
| WO | 2012138952 A1 | | 10/2012 |
| WO | 2016105961 A1 | | 6/2016 |
| WO | 2017014752 A1 | | 1/2017 |

OTHER PUBLICATIONS

Bryan Lloyd et al. "Effective Address Based Load Store Unit in Out of Order Processors", U.S. Appl. No. 15/825,588, filed Nov. 29, 2017.

Bryan Lloyd et al. "Handling Effective Address Synonyms in a Load-Store Unit That Operates Without Address Translation", U.S. Appl. No. 15/825,494, filed Nov. 29, 2017.

Bryan Lloyd et al. "Handling Effective Address Synonyms in a Load-Store Unit That Operates Without Address Translation", U.S. Appl. No. 15/825,532, filed Nov. 29, 2017.

Christopher J. Gonzalez et al. "Executing Load-Store Operations Without Address Translation Hardware Per Load-Store Unit Port", U.S. Appl. No. 15/825,625, filed Nov. 29, 2017.

Christopher J. Gonzalez et al. "Load-Store Unit With Partitioned Reorder Queues With Single Cam Port", U.S. Appl. No. 15/825,453, filed Nov. 29, 2017.

List of IBM Patents or Patent Applications Treated as Related; (Appendix P), Filed Nov. 30, 2017; 2 pages.

Bryan Lloyd et al. "Address Translation for Sending Real Address To Memory Subsystem in Effective Address Based Load-Store Unit", U.S. Appl. No. 15/726,650, filed Oct. 6, 2017.

Bryan Lloyd et al. "Effective Address Based Load Store Unit in out of Order Processors", U.S. Appl. No. 15/726,522, filed Oct. 6, 2017.

Bryan Lloyd et al. "Handling Effective Address Synonyms in a Load-Store Unit That Operates Without Address Translation", U.S. Appl. No. 15/726,596, filed Oct. 6, 2017.

Bryan Lloyd et al. "Handling Effective Address Synonyms in a Load-Store Unit That Operates Without Address Translation", U.S. Appl. No. 15/726,610, filed Oct. 6, 2017.

Bryan Lloyd et al. "Hazard Detection of Out-of-Order Execution of Load and Store Instructions in Processors Without Using Real Addresses", U.S. Appl. No. 15/726,538, filed Oct. 6, 2017.

Christopher Gonzalez et al. "Load-Hit-Load Detection in an Out-of-Order Processor", U.S. Appl. No. 15/726,563, filed Oct. 6, 2017.

Christopher Gonzalez et al. "Address Translation for Sending Real Address to Memory Subsystem in Effective Address Based Load-Store Unit", U.S. Appl. No. 15/726,575, filed Oct. 6, 2017.

(56) References Cited

OTHER PUBLICATIONS

Christopher J. Gonzalez et al. "Executing Load-Store Operations Without Address Translation Hardware Per Load-Store Unit Port", U.S. Appl. No. 15/726,639, filed Oct. 6, 2017.
List of IBM Patents or Patent Applications Treated as Related; (Appendix P), Filed Nov. 27, 2017; 2 pages.
List of IBM Patents or Patent Applications Treated as Related; Date Filed: Feb. 21, 2020, 2 pages.
Lloyd et al., "Handling Effective Address Synonyms in a Load-Store Unit That Operates Without Address Translation," U.S. Appl. No. 16/793,835, filed Feb. 19, 2020.
"Load/Store Instructions" www.cs.uaf.edu/2000/fall/cs301/notes/node67.html, pp. 1-4. (Year: 1999).
Anonymously; Improved prefetching of data in a computer processor by identifying and making use of correlated prefetch queue entry information; http://ip.com/IPCOM/000226438D, pp. 1-5.
Anonymously; "Predictive address translation prefetch for units using an address translation caching mechanism"; http://ip.com/IPCOM/000245589D; Mar. 21, 2016, pp. 1-2.
Apolloni et al.; "Hybrid Timing-Address Oriented Load-Store Queue Filtering For An x86 Architecture", IET Computers & Digital Techniques, Jan. 22, 2010, pp. 1-13.
Christopher J. Gonzalez et al. "Load-Store Unit With Partitioned Reorder Queues With Single Cam Port", U.S. Appl. No. 15/726,627, filed Oct. 6, 2017.
Gonzalez et al., "Executing Load-Store Operations Without Address Translation Hardware Per Load-Store Unit Port," U.S. Appl. No. 16/448,383, filed Jun. 21, 2019.
IBM, "Per-Thread Valid Bits for Multithreaded Effective to Real Address Translation (ERAT)", http://ip.com/IPCOM/000022179D, Mar. 1, 2004, pp. 1-2.
IBM, "The IBM Power8 Processor Core Microarchitecture", IBM Corporation, www.ibm.com/whitepaper, 2016, pp. 1-126.

International Search Report; International Application No. PCT/IB2018/057694; International Filing Date: Oct. 3, 2018; dated Jan. 30, 2019; 9 pages.
International Search Report; International Application No. PCT/IB2018/057695; International Filing Date: Oct. 3, 2018; dated Jan. 30, 2019; 9 pages.
Katevenis, "Interprocessor Communication Seen As Load-Store Instruction Generalization", Institute of Computer Science, Foundation for Research and Technology—Hellas (FORTH-ICS), 2007, pp. 1-14.
Lloyd et al., "Hazard Detection of Out-of-Order Execution of Load and Store Instructions in Processors Without Using Real Addresses", U.S. Appl. No. 16/449,714, filed Jun. 24, 2019.
Postiff et al. "The Store-Load Address Table And Speculative Register Promotion", IEEE/ACM Symposium Microarchitecture, Dec. 2000, pp. 1-10.
Qiu, et al., "The Synonym Lookaside Buffer: A Solution to the Synonym Problem in Virtual Caches," IEEE Transactions on Computers 57, No. 12, 2008, pp. 1585-1599.
Sethumadhavan et al., "Late-Binding—Enabling Unordered Load-Store Queues," Department of Computer Sciences, The University of Texas at Austin, pp. 1-11.
Sinharoy et al. "IBM POWER8 Processor Core Microarchitecture", IBM J. Res & Dev. vol. 59, No. 1, Paper 2, Jan./Feb. 2015, pp. 1-22.
Sura et al., "Data Access Optimization in a Processing-in-Memory System," ACM 978-1-4503-3358-0/15/05, May 18-21, 2015, pp. 1-8.
Watcharawitch, "MulTEP: A MultiThreaded Embedded Processor", Technical Report, No. 588, May 2004, pp. 1-190.
Yoon, et al., "Revisiting Virtual L1 Caches: A Practical Design Using Dynamic Synonym Remapping," 2016 IEEE International Symposium on High Performance Computer Architecture (HPCA), IEEE, 2016, pp. 212-224.

* cited by examiner

LOAD-STORE UNIT WITH PARTITIONED REORDER QUEUES WITH SINGLE CAM PORT

BACKGROUND

Embodiments of the present invention relate in general to an out-of-order (OoO) processor and more specifically to a load-store unit (LSU) implementing partitioned load and store reorder queues with a single content address memory (CAM) port to efficiently support out-of-order execution of instructions in the OoO processor.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues. The ISU includes one or more issue queues that contain dependency matrices for tracking dependencies between instructions. A dependency matrix typically includes one row and one column for each instruction in the issue queue.

SUMMARY

Embodiments of the present invention include methods, systems, and computer program products for implementing effective address based load store unit in out of order processors. A non-limiting example of a processing unit for executing one or more instructions includes a load-store unit (LSU) that executes a plurality of instructions in an out-of-order (OoO) window using multiple lsu pipes. The execution includes selecting an instruction from the OoO window, the instruction using an effective address; and in response to the instruction being a load instruction: in response to the processing unit operating in a single thread mode, creating an entry in a first partition of a load reorder queue based on the instruction being issued on a first load pipe, and creating the entry in a second partition of the load reorder queue based on the instruction being issued on a second load pipe. The execution also includes in response to the processing unit operating in a multi-thread mode where multiple threads are processed simultaneously, creating the entry in a first predetermined portion of the first partition of the load reorder queue based on the instruction being issued on the first load pipe and by a first thread of the processing unit.

According to one or more embodiments a computer-implemented method for out-of-order execution of one or more instructions by a processing unit includes receiving, by a load-store unit (LSU) of the processing unit, an out-of-order window of instructions including a plurality of instructions to be executed out-of-order; and issuing, by the LSU, instructions from the OoO window. The issuing of the instructions includes selecting an instruction from the OoO window, the instruction using an effective address; and in response to the instruction being a load instruction: in response to the processing unit operating in a single thread mode, creating an entry in a first partition of a load reorder queue based on the instruction being issued on a first load pipe, and creating the entry in a second partition of the load reorder queue based on the instruction being issued on a second load pipe. The execution also includes in response to the processing unit operating in a multi-thread mode where multiple threads are processed simultaneously, creating the entry in a first predetermined portion of the first partition of the load reorder queue based on the instruction being issued on the first load pipe and by a first thread of the processing unit.

According to one or more embodiments a computer program product includes a computer readable storage medium having program instructions embodied therewith, where the program instructions executable by a processing unit to cause the processing unit to perform operations. The operations include receiving, by a load-store unit (LSU) of the processing unit, an out-of-order window of instructions including a plurality of instructions to be executed out-of-order; and issuing, by the LSU, instructions from the OoO window. The issuing of the instructions includes selecting an instruction from the OoO window, the instruction using an effective address; and in response to the instruction being a load instruction: in response to the processing unit operating in a single thread mode, creating an entry in a first partition of a load reorder queue based on the instruction being issued on a first load pipe, and creating the entry in a second partition of the load reorder queue based on the instruction being issued on a second load pipe. The execution also includes in response to the processing unit operating in a multi-thread mode where multiple threads are processed simultaneously, creating the entry in a first predetermined portion of the first partition of the load reorder queue based on the instruction being issued on the first load pipe and by a first thread of the processing unit.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
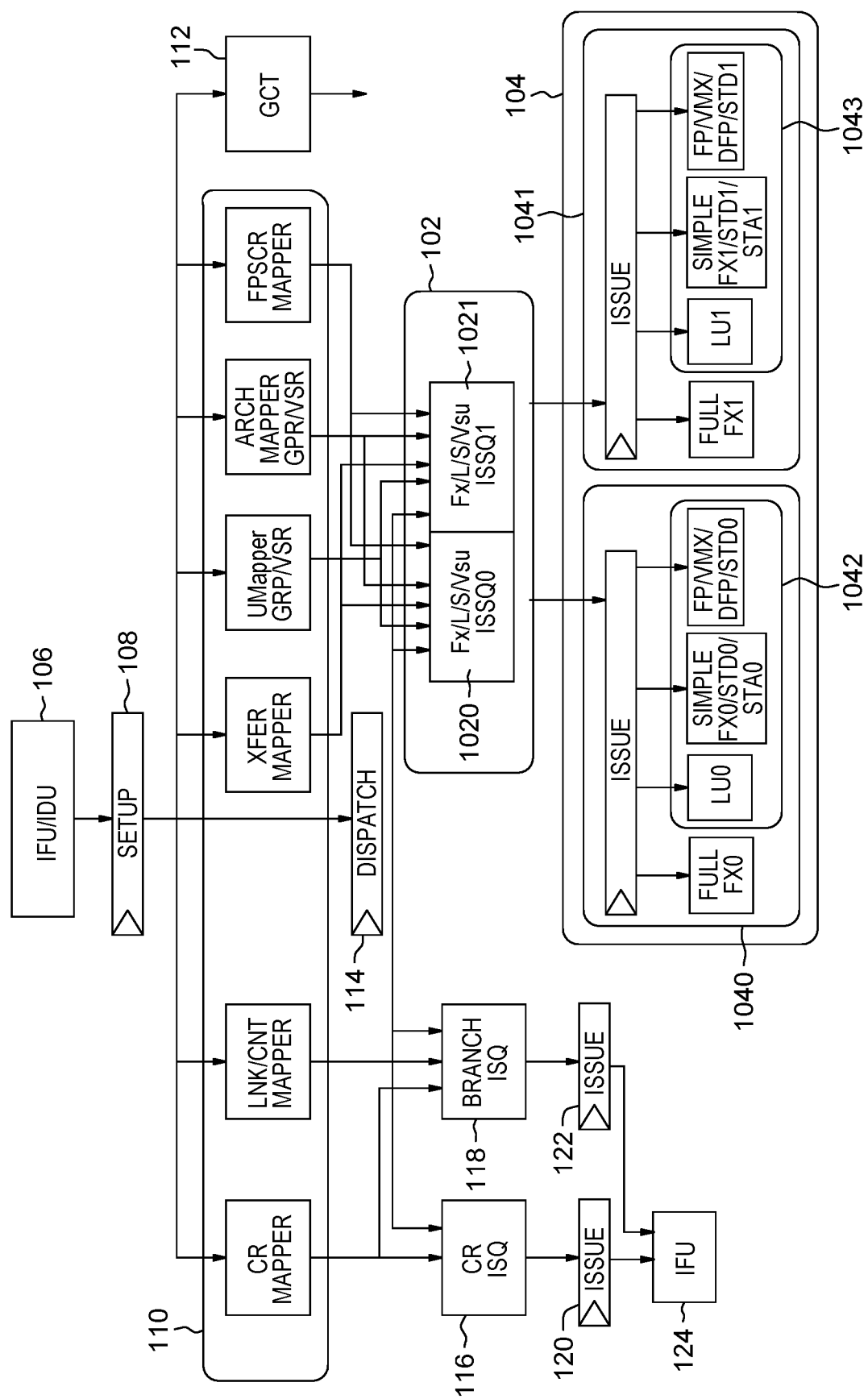
FIG. 1 depicts a block diagram of a system that includes an effective address based load store unit in an out of order processor in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention described herein provide an effective address (EA) based load store unit (LSU) for an out-of-order (OoO) processor by dynamic removal of effective real address table entries in the OoO processor. The technical solutions described herein use an effective address directory (EAD) in conjunction with an effective real table (ERT) and a synonym detection table (SDT), among other components, to facilitate reduction in chip area and further to improve timing of OoO processors. Further, the technical solutions described herein facilitate an OoO LSU to execute load/store instructions in an out-of-order manner. The OoO LSU executes the load/store instructions using multiple pipes to provide an improved performance. The multi-pipe implementation of the LSU is based on partitioned ERT, load reorder queue (LRQ), and store reorder queue (SRQ) as described herein.

Most modern computing devices provide support for virtual memory. Virtual memory is a technique by which application programs are given the impression that they have a contiguous working memory, or address space, when in fact the physical memory may be fragmented and may even overflow onto disk storage. Essentially, the application program is given a view of the memory of the computing device where the application accesses a seemingly contiguous memory using an effective address, in the effective address space visible to the application, which is then translated into a physical address of the actual physical memory or storage device(s) to actually perform the access operation. An effective address is the value which is used to specify a memory location that is to be accessed by the operation from the perspective of the entity, e.g., application, process, thread, interrupt handler, kernel component, etc., issuing the operation.

That is, if a computing device does not support the concept of virtual memory, then the effective address and the physical address are one and the same. However, if the computing device does support virtual memory, then the effective address of the particular operation submitted by the application is translated by the computing device's memory mapping unit into a physical address which specifies the location in the physical memory or storage device(s) where the operation is to be performed.

Further, in modern computing devices, processors of the computing devices use processor instruction pipelines, comprising a series of data processing elements, to process instructions (operations) submitted by entities, e.g., applications, processes, etc. Instruction pipelining is a technique to increase instruction throughput by splitting the processing of computer instructions into a series of steps with storage at the end of each step. Instruction pipelining facilitates the computing device's control circuitry to issue instructions to the processor instruction pipeline at the processing rate of the slowest step which is much faster than the time needed to perform all steps at once. Processors with instruction pipelining, i.e. pipelined processors, are internally organized into stages which can semi-independently work on separate jobs. Each stage is organized and linked with a next stage in a series chain so that each stage's output is fed to another stage until the final stage of the pipeline.

Such pipelined processors may take the form of in-order or out-of-order pipelined processors. For in-order pipelined processors, instructions are executed in order such that if data is not available for the instruction to be processed at a particular stage of the pipeline, execution of instructions through the pipeline may be stalled until the data is available. Out-of-order pipelined processors, on the other hand, allow the processor to avoid stalls that occur when the data needed to perform an operation are unavailable. The out-of-order processor instruction pipeline avoids these stalls by filling in "slots" in time with other instructions that are ready to be processed and then re-ordering the results at the end of the pipeline to make it appear that the instructions were processed in-order. The way the instructions are ordered in the original computer code is known as program order, whereas in the processor they are handled in data order, i.e. the order in which the data and operands become available in the processor's registers.

Modern processor instruction pipelines track an instruction's effective address as the instruction flows through the instruction pipeline. It is important to track the instruction's effective address because this effective address is utilized whenever the processing of an instruction results in the taking of an exception, the instruction flushes to a prior state, the instruction branches to a new memory location relative to its current memory location, or the instruction completes its execution.

Tracking an instruction's effective address is costly in terms of processor chip area, power consumption, and the like. This is because these effective addresses have large sizes (e.g., 64 bits) and modern processor instruction pipelines are deep, i.e. have many stages, causing the lifetime of an instruction from an instruction fetch stage of the processor instruction pipeline to a completion stage of the processor instruction pipeline to be very long. This cost may be further increased in highly multi-threaded out-of-order processors, i.e. processors that execute instructions from multiple threads in an out-of-order manner, since a vast number of instructions from different address ranges can be processing, i.e. are "in flight," at the same time.

In one or more examples, computing devices use a combination of pipeline latches, a branch information queue (BIQ), and a global completion table (GCT) to track an instruction's effective address. The base effective address (EA) for a group of instructions is transferred from the front-end of the pipeline using latches until it can be deposited and tracked in the GCT of the instruction sequencer unit (ISU). The number of latches needed to store this data is on the order of the number of pipeline stages between a Fetch stage and a Dispatch stage of the pipeline. This is wasteful, as the EA is typically not needed during these stages. Rather it is simply payload data that is "along for the ride" with the instruction group as it flows through the pipeline. In addition, this method leads to duplicate storage as branch instructions have their EAs in both the BIQ and the GCT.

Accordingly, computing devices have been developed, that remove these inefficiencies by tracking the EA solely in the GCT. For example, these new computing devices, an instruction sequencer unit creates an entry in the GCT at fetch time. The EA is loaded into the GCT at this time and then removed when the instruction completes. This eliminates many pipeline latches throughout the machine. Instead of a full EA that is as long as number of address lines, for example a 64-bit EA, a small tag is carried along with the instruction group through the pipeline. This tag points back to the entry in the GCT, which holds the base EA for this instruction group. Address storage in the BIQ is no longer needed as branches can retrieve their EA directly from the GCT when they issue. Such techniques improve area efficiency, but they are not applicable in an out-of-order processor. Further, they lack sufficient information to process address requests arriving out of program order. In addition, these techniques cannot support dispatch and completion bandwidth required for out-of-order execution because they lack the ability to track instruction groups that may have been formed from multiple disjoint address ranges. Historically, such mechanisms have only supported instruction groups from a single address range, which can significantly reduce the number of instructions available to execute out-of-order. Further, to lookup corresponding addresses, such as an RA corresponding to an EA (or vice versa) a content addressable memory (CAM) is used. A CAM implements lookuptable function in a single clock cycle using dedicated comparison circuitry. The overall function of a CAM is to take a search word and return the matching memory location. However, such CAM takes chip area as well as consumes power for such lookups.

The illustrative embodiments of technical solutions described herein improve upon these techniques by providing an effective address directory (EAD), an effective real table (ERT), and a synonym detection table (SDT) that have the area efficiency of the GCT solution described above, but can also support a wide issue out-of-order pipeline while not inhibiting performance. The technical solutions described herein further facilitate the processors to run with only EAs, as long as the processor can avoid EA synonyms within an out of order (OoO) window. The OoO window is a set of instructions in an instruction pipeline of the processor. By avoiding EA synonyms in the OoO window, the processor reduces the chip area and power consumption for address translation, because the processor can avoid translation for the EA in the OoO window. This is because load-hit-store (LHS), store-hit-load (SHL), and load-hit-load (LHL) conditions no longer are to be detected for inflight instructions, as EA synonyms are no longer present in the OoO window.

In other words, the technical solutions described herein address the technical problem by policing against EA aliasing within the OoO window, and thus reducing translation data structures and hardware for the load/store ports. Accordingly, the technical solutions described herein facilitate a reduction in chip area by tracking only one address, the EA. Further, the technical solutions facilitate the OoO processor to run in a 2 load and 2 store mode with partitioned load store queues, further reducing CAM ports that are typically used for the address translation.

In addition, if the OoO processor supports multi-threaded (MT) operations, for each thread operating in the out of order manner, the OoO processor has to facilitate multiple CAM ports for each load/store queue in a load-store unit for converting EAs to RAs and vice versa. For example, consider an OoO processor that executes four threads in the MT mode, each thread executing concurrently by executing independent instructions. In this case, a load-store unit (LSU) of the OoO processor, typically uses 4 or more CAM ports for each load/store queue for translating effective addresses to real addresses and vice versa. Such multiple CAM ports for address translation occupy substantial chip area and further consume power. The technical solutions described herein address such technical challenge of multiple CAM ports for multiple threads.

One or more exemplary embodiments of the invention described herein address aspects of the technical challenges described herein by using a single CAM port for the load/store queues, thus reducing the chip area and power used for the address translations. For example, the exemplary embodiments of the present invention described herein can facilitate the LSU to be a multi-load and multi-store LSU with partitioned load/store queues, which facilitates reducing the number of CAM ports for the address translation. A 'multi-load LSU' is an LSU that issues multiple load instructions concurrently on separate pipes for each load instruction. For example, a '2-load LSU' is an LSU that issues two load instructions concurrently on two separate pipes, LD0, and LD1. Similarly, a 'multi-store LSU' is an LSU that issues multiple store instructions concurrently on separate pipes for each store instruction. For example, a '2-store LSU' is an LSU that issues two store instructions concurrently on two separate pipes, ST0, and ST1.

Turning now to FIG. 1, a block diagram of a system 100 that includes an instruction sequencing unit (ISU) of an out-of-order (OoO) processor for implementing the technical solutions for avoiding EA synonyms in an OoO instruction window is generally shown according to one or more embodiments of the present invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments of the present invention, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments of the present invention, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue an instruction to IFU 124 to redirect instruction fetching if a predicted branch address and/or direction was incorrect.

Instructions output from the dispatch logic and renamed registers from the LNK/CNT mapper, XER mapper, UMapper (GPR/VSR), ARCH Mapper (GPR/VSR), and FPSCR mapper are input to issue queue 102. As shown in FIG. 1, issue queue 102 tracks dispatched fixed point instructions (Fx), load instructions (L), store instructions (S), and vector-and-scaler unit (VSU) instructions. As shown in the embodiment of FIG. 1, issue queue 102 is broken up into two parts, ISQ0 1020 and ISQ1 1021, each portion holding N/2 instructions. When the processor is executing in single threaded (ST) mode, the issue queue 102 can be used as a single logical issue queue that contains both ISQ0 1020 and ISQ1 1021 to process all of the instructions (in this example all N instructions) of a single thread.

When the processor is executing in multi-threaded (MT) mode, ISQ0 1020 can be used to process N/2 instructions from a first thread and ISQ1 1021 is used to process N/2 instructions from a second thread ISQ1 1021.

As shown in FIG. 1, issue queue 102 issues instructions to execution units 104 which are split into two groups of execution units, 1040 and 1041. Both groups of execution units, 1040 and 1041, that are shown in FIG. 1, include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). Collectively, the LU0, the Simple FX0/STD0/STA0, and the FP/VMX/DFP/STD0 form a load-store unit (LSU) 1042. Similarly, the LU1, the Simple FX1/STD1/STA1, and the FP/VMX/DFP/STD1 form a load-store unit (LSU) 1043. The two LSUs 1042 and 1043 together are referred to as an LSU of the system 100.

As shown in FIG. 1, when the processor is executing in ST mode, the first group of execution units 1040 execute instructions issued from ISQ0 1020 and the second group of execution units 1041 execute instructions issued from ISQ1 1021. In alternate embodiments of the present invention when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments of the present invention, when the processor is executing in MT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
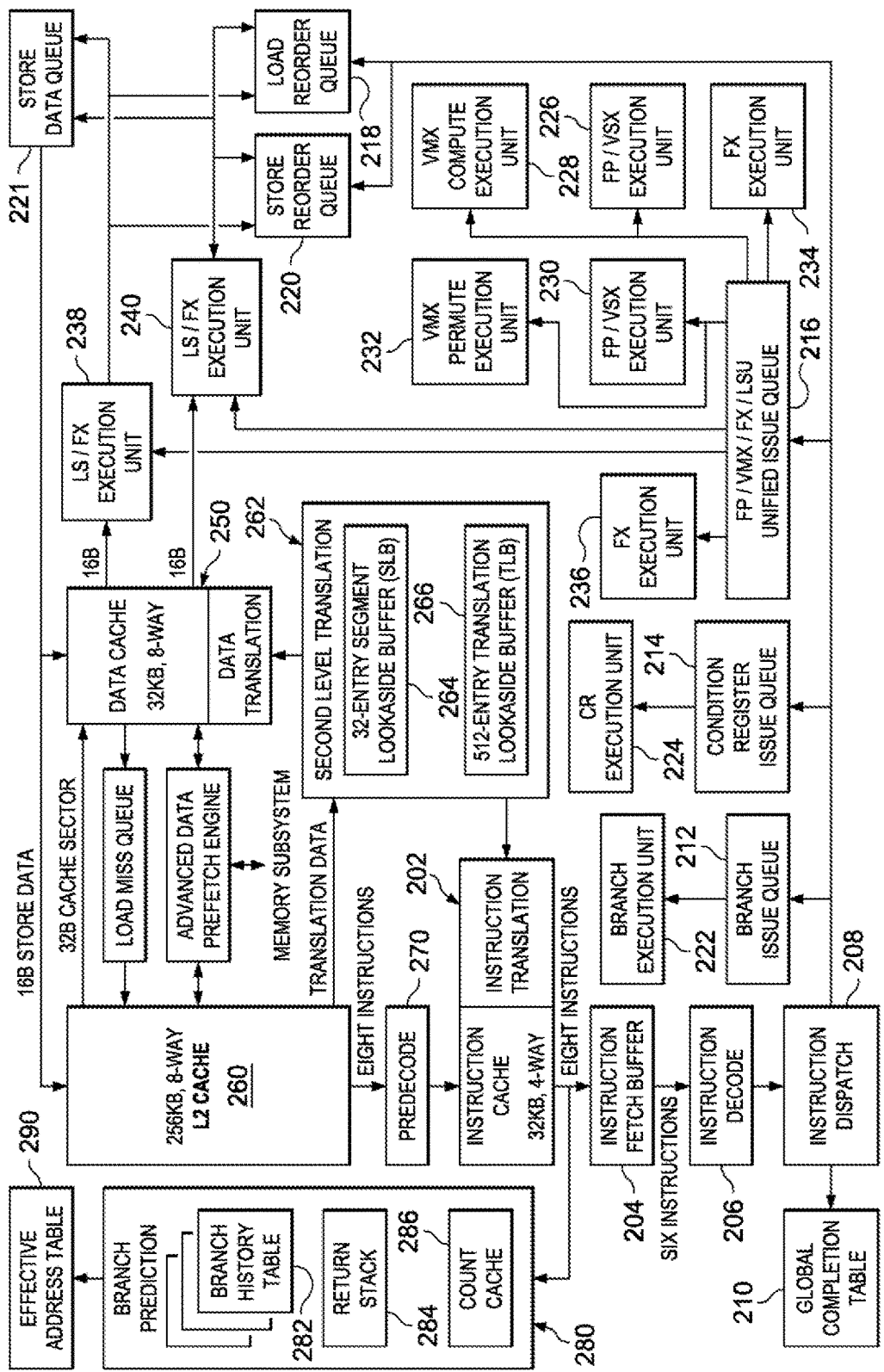
FIG. 2 is an exemplary block diagram of a processor architecture of OoO processor in which an effective address directory (EAD) and the associated mechanisms for utilizing this EAD are implemented according to one or more embodiments of the present invention.

In one or more examples, the system 100, in accordance with the illustrative embodiments, is an OoO processor. FIG. 2 is an exemplary block diagram of a processor architecture of OoO processor in which an effective address directory (EAD) and the associated mechanisms for utilizing this EAD are implemented according to one or more embodiments of the present invention. As shown in FIG. 2, the processor architecture includes an instruction cache 202, an instruction fetch buffer 204, an instruction decode unit 206, and an instruction dispatch unit 208. Instructions are fetched by the instruction fetch buffer 204 from the instruction cache 202 and provided to the instruction decode unit 206. The instruction decode unit 206 decodes the instruction and provides the decoded instruction to the instruction dispatch unit 208. The output of the instruction dispatch unit 208 is provided to the global completion table 210 and one or more of the branch issue queue 212, the condition register issue queue 214, the unified issue queue 216, the load reorder queue 218, and/or the store reorder queue 220, depending upon the instruction type. The instruction type is determined through the decoding and mapping of the instruction decode unit 206. The issue queues 212-220 provide inputs to various ones of execution units 222-240. The data cache 250, and the register files contained with each respective unit, provides the data for use with the instructions.

The instruction cache 202 receives instructions from the L2 cache 260 via the second level translation unit 262 and pre-decode unit 270. The second level translation unit 262 uses its associate segment look-aside buffer 264 and translation look-aside buffer 266 to translate addresses of the fetched instruction from effective addresses to system memory addresses. The pre-decode unit partially decodes instructions arriving from the L2 cache and augments them with unique identifying information that simplifies the work of the downstream instruction decoders.

The instructions fetched into the instruction fetch buffer 204 are also provided to the branch prediction unit 280 if the instruction is a branch instruction. The branch prediction unit 280 includes a branch history table 282, return stack 284, and count cache 286. These elements predict the next effective address (EA) that should be fetched from the instruction cache. A branch instruction is a point in a computer program where flow of control is altered. It is the low-level machine instruction that is generated from control constructs in a computer program, such as if-then-else or do-while statements. A branch can be not taken, in which the flow of control is unchanged and the next instruction to be executed is the instruction immediately following it in memory, or it can be taken, in which the next instruction to be executed is an instruction at some other place in memory. If the branch is taken, a new EA needs to be presented to the instruction cache.

The EA and associated prediction information from the branch prediction unit are written into an effective address directory 290. This EA is later confirmed by the branch execution unit 222. If correct, the EA remains in the directory until all instructions from this address region have completed their execution. If incorrect, the branch execution unit flushes out the address and the corrected address is written in its place. The EAD 290 also includes a logic unit that facilitates using the directory as a CAM.

Instructions that read from or write to memory (such as load or store instructions) are issued to the LS/EX execution unit 238, 240. The LS/EX execution unit retrieves data from the data cache 250 using a memory address specified by the instruction. This address is an effective address and needs to first be translated to a system memory address via the second level translation unit before being used. If an address is not found in the data cache, the load miss queue is used to manage the miss request to the L2 cache. In order to reduce the penalty for such cache misses, the advanced data prefetch engine predicts the addresses that are likely to be used by instructions in the near future. In this manner, data will likely already be in the data cache when an instruction needs it, thereby preventing a long latency miss request to the L2 cache.

The LS/EX execution unit 238, 240 executes instructions out of program order by tracking instruction ages and memory dependences in the load reorder queue 218 and store reorder queue 220. These queues are used to detect when out-of-order execution generated a result that is not consistent with an in-order execution of the same program. In such cases, the current program flow is flushed and performed again.

The processor architecture further includes the effective address directory (EAD) 290 which maintains the effective address of a group of instructions in a centralized manner such that the effective address is available when needed but is not required to be passed through the pipeline. Moreover, the EAD 290 includes circuitry and/or logic for supporting out-of-order processing. FIG. 2 shows the EAD 290 being accessed via the branch prediction unit 280, however, it should be appreciated that circuitry may be provided for allowing various ones of the units shown in FIG. 2 to access the EAD 290 without having to go through the branch prediction unit 280.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device configured with flash memory to provide non-volatile memory for storing operating system files and/or user-generated data, for example. Essentially, data processing system 100 may be any known or later developed data processing system without architectural limitation.

As will be appreciated by one skilled in the art, the present invention may be embodied as a system, apparatus, or method. In one illustrative embodiment, the mechanisms are provided entirely in hardware, e.g., circuitry, hardware modules or units, etc. of a processor. However, in other illustrative embodiments, a combination of software and hardware may be utilized to provide or implement the features and mechanisms of the illustrative embodiments. The software may be provided, for example, in firmware, resident software, micro-code, or the like. The various flowcharts set forth hereafter provide an outline of operations that may be performed by this hardware and/or combination of hardware and software.

In illustrative embodiments in which the mechanisms of the illustrative embodiments are at least partially implemented in software, any combination of one or more computer usable or computer readable medium(s) that store this software may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a random access memory (RAM), a read-only memory (ROM), an erasable programmable read-only memory (EPROM or Flash memory), etc.

Typically, for every load and every store instruction, an EA is converted to corresponding RA. Such an EA to RA conversion is also performed for an instruction fetch (I-fetch). Such conversion typically required an effective to real address table (ERAT) for retrieval of instructions from lower order memory. In the technical solutions described herein, the EA to RA conversion is not performed for every load and store instruction, rather only in case of load-misses, I-Fetch misses, and all stores.

By using only EA for the operations, the technical solutions facilitate removal of RA bits (for example, bits 8:51) from one or more data structures, such as an EA directory (also referred to as L1 directory), LRQF entries, LMQ entries. Further, SRQ LHS RA compare logic is not executed if only the EA is being used. Removing such elements reduces chip area of the processor used, thus facilitating a reduction in chip area over typical processors.

Further, by only using EA, the technical solutions herein eliminate ERAT camming on every load and store address generation. The technical solutions further eliminate RA bus switching throughout the unit, and also avoids fast SRQ LHS RA cam. The technical solutions thus facilitate the processor to consume lesser power compared to typical processors by not performing the above operations.

Further yet, the technical solutions herein also facilitate improvements to L1 latency. For example, the technical solutions herein, by eliminating the address conversions are at least 1 cycle faster in determining "final dval" compared to typical processors that perform the EA to RA conversions. The latency is also improved because by using only the EA (without RA conversion) eliminates "bad dval" condition(s), such as setup table multi-hit, setup table hit/RA miss, and the like. In a similar manner, the technical solutions herein facilitate improvement to L2 latency.

The technical challenges of using only an EA-based LSU include being able to handle snoops from the L2. For example, the LSU has to be able to have a reverse RA to EA translation. Accordingly, the technical solutions herein facilitate converting RA based snoop from the L2 to EA based snoop to the LSU subunits.

Further, the only-EA based LSU has a technical challenge of handling same thread synonyms (that is, two different EA from a thread maps to the same RA). The technical solutions address such technical challenges using either an synonym detection table (SDT) or an ERT eviction (ERTE) table as described herein. For example, across LHS, SHL, and LHL, L1 accesses where synonym is defined as:

$$Tid=w, EA(0:51)=x => RA(8:51)=z;$$

$$Tid=w, EA(0:51)=y => RA(8:51)=z.$$

Thus, different EAs correspond to the same RA. The technical solutions, as described herein, facilitate rejecting synonym EA's & relaunching with corresponding primary EA.

Figure 3:
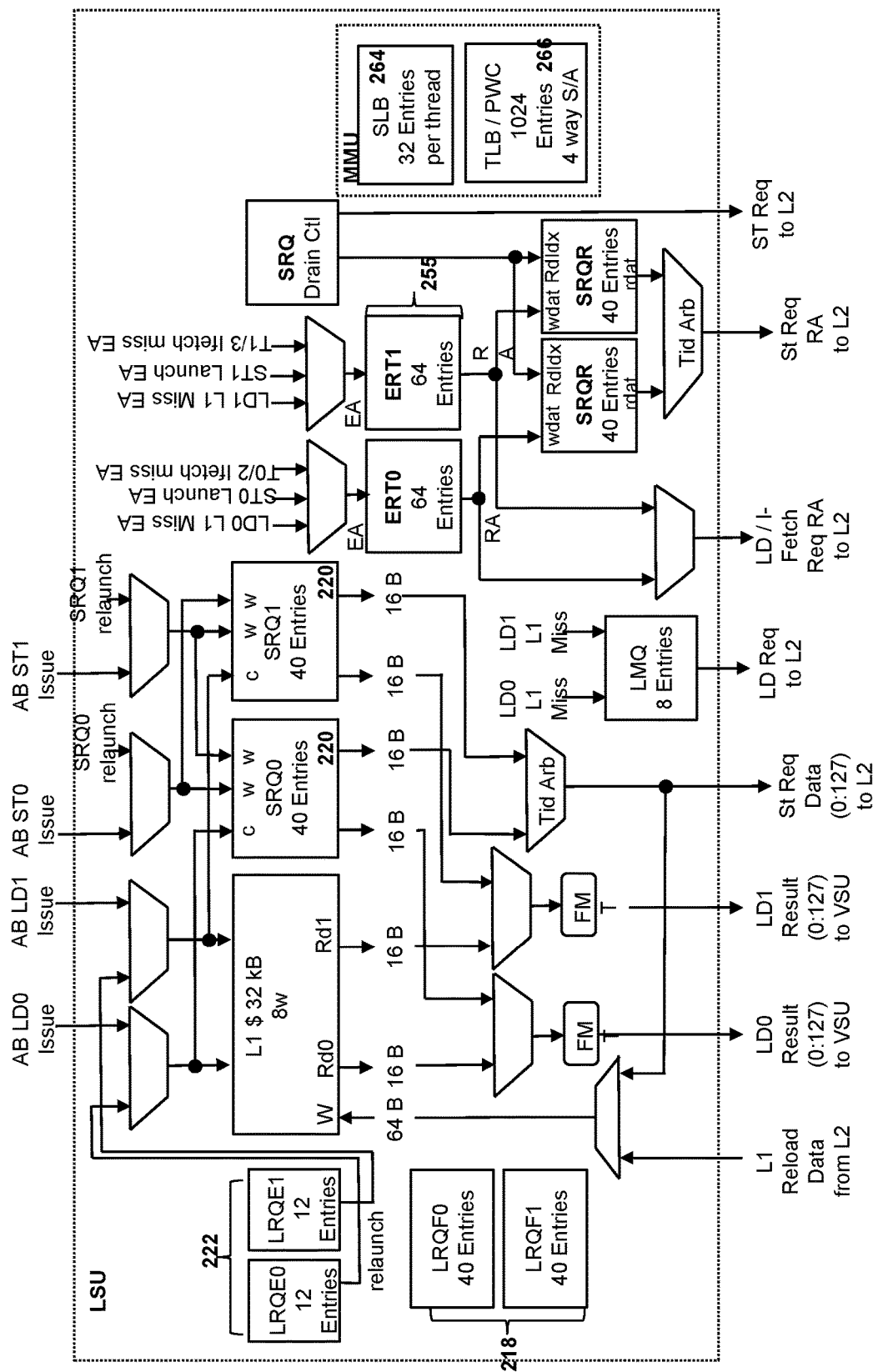
FIG. 3 depicts a load-store unit (LSU) of a processing core according to one or more embodiments of the present invention.

Referring again to the figures, FIG. 3 depicts a load-store unit (LSU) 104 of a processing core according to one or more embodiments of the present invention. The LSU 104 depicted facilitates execution in a 2 load 2 store mode; however, it should be noted that the technical solutions described herein are not limited to such an LSU. The execution flow for the LSU is described below. From the load or store instructions the EA (Effective Address, as used by the programmer in a computer program) is generated. Similarly, for instruction fetch also an EA is generated. Typically, the EA was converted to RA (Real Address, as used by the hardware, after EA-to-RA translation) for every instruction, which required larger chip area, and frequent translations, among other technical challenges. The technical solutions described herein address such technical challenges by using only the EA (without translation to RA), and using an effective real table (ERT) 255 to generate the RA, only on load-misses, I-Fetch misses and stores.

The LSU 104 includes a load-reorder-queue (LRQF) 218, where all load operations are tracked from dispatch to complete, similar to an LRQ 218 in typical LSU designs. The LSU 104 further includes a second load-reorder-queue LRQE 222. When a load is rejected (for cache miss, or translation miss, or previous instruction it depends on got rejected) the load is taken out of the issue queue and placed in a LRQE entry for it to be re-issued from there. The depicted LRQE 222 is partitioned into 2 instances, LRQE0, and LRQE1 for the two load mode, with 12 entries each (24 entries total). In ST mode, no threads/pipe based partition exists. In the MT mode, T0, T2 operations launched on pipe LD0; and T1, T3 operations launched on pipe LD1, for relaunch. Here Tx is thread-x, for example, T0 is thread-0, T1 is thread-1, T2 is thread-2, and T3 is thread-3. It should be noted that although the examples herein use four threads in the MT mode, in other examples, the MT mode may include execution of a different number of threads concurrently, such as 8, 16 or any other. In one or more examples, the number of threads in the MT mode is configurable. Further, in the examples herein the LSU 104 uses two load pipes LD0 and LD1, however in other examples, the number of pipes may be different, for example 3, 4, 8, and so on. In one or more examples, the LRQF 218 is partitioned into as many partitions as the number of pipes.

As depicted, the LRQF 218 is partitioned into 2 instances LRQF0 and LRQF1 for the two load mode, with 40 entries (each instance). The LRQF 218 is circular in order entry allocation, circular in order entry drain, and circular in order entry deallocation. Further, in MT mode, T0, T2 operations launched on pipes LD0, ST0; and T1, T3 operations launched on pipes LD1, ST1. In ST mode, the LRQF does not have any pipes/threads.

In one or more examples, the LRQF 218 (and other structures described herein) is partitioned for the SMT4 mode as T0: LRQF0[0:19] circular queue, T1: LRQF1[0:19] circular queue; and T2: LRQF0[20:39] circular queue, T3: LRQF1[20:39] circular queue.

In one or more examples, the LRQF 218 (and other structures described herein) is partitioned for the SMT2 mode as T: LRQF0[0:39] circular queue, and T1: LRQF1 [0:39] circular queue. Further, in one or more examples, for the ST mode, LRQF0[0:39] circular queue, with the LRQF1 being an LRQF0 copy. For other data structure, a similar partition pattern is used with the second instance being a copy of the first instance in ST mode.

In case of a cross invalidation flush (XI flush), for the LRQF, NTC+1 flush any thread that an XI or store drain from another thread hits so that explicit L/L ordering flushes on sync's is not performed by the LSU 104 in case of the XI flush.

All stores check against the LRQF 218 for SHL detection, upon which the LRQF 218 initiates a flush of any load, or everything (any instruction/operation) after the store. Further, DCB instructions check against the LRQF 218 for SHL cases, upon which the LRQF 218 causes a flush of the load, or everything after the DCB. Further, all loads check against the LRQF 218 for LHL detection (sequential load consistency), upon which the LRQF 218 causes a flush of younger load, or everything after the older load. In one or more examples, the LRQF 218 provides quad-word atomicity, and the LQ checks against the LRQF 218 for quad atomicity and flushes LQ if not atomic. Further yet, in case of LARX instructions, the LSU 104 checks against the LRQF 218 for larx-hit-larx cases, and in response flushes younger LARX, or everything after the older larx instruction.

Thus, the LRQF 218 facilitates tracking all load operations from issue to completion. Entries in the LRQF 218 are indexed with Real_Ltag (rltag), which is the physical location in the queue structure. The age of a load operation/entry in the LRQF 218 is determined with a Virtual_Ltag (vltag), which is in-order. The LRQF flushes a load using GMASK and partial group flush using GTAG and IMASK. The LRQF logic can flush from current iTag or iTag+1 or precise load iTag.

Further yet, the LRQF does not include an RA (8:51) field typically used, and instead is EA-based and includes an ERT ID (0:6), and EA(40:51) (saving of 24 bits). The LRQF page match on SHL, LHL is based on ERT ID match. Further, Each LRQ entry has a "Force Page Match" bit. When an ERT ID is invalidated that matches the LRQ Entry ERT ID the Force Page Match bit is set. The LRQ will detect LHL, SHL, and store ordering flushes involving any entry with Force Match Match=1.

Thus, the LRQF 218 addresses the technical challenge of multiple CAM ports occupying chip area and consuming power for address translation, by maintaining a partitioned load request queue, which is partitioned for a predetermined number of instructions and a predetermined number of threads that the OoO processor can simultaneously execute.

The SRQ 220 of the LSU 104 has similar structure as the LRQF 218, with two instances SRQR0 and SRQR1 of 40 entries (each instance), which are circular in order entry allocation, circular in order entry drain, and circular in order entry deallocation. Further, the SRQ 220 is partitioned similar to the LRQ 218, for example T0, T2 ops launched on pipes LD0, ST0; T1, T3 ops launched on pipes LD1, ST1; and no pipe/thread partition in ST mode. In the ST mode, both copies have identical values, with the copies being different in the MT modes. In SMT4 mode, both instances are further partitioned, with each thread allocated 20 entries from the SRQ 220 (see example partition for LRQF described herein). In one or more examples, for store drain arbitration, an intra-SRQ read pointer multiplexing is performed in the SMT4 mode. Alternatively, or in addition, an inter SRQ0/1 multiplexing is performed in SMT2, and SMT4 modes. In the ST mode drain is performed only on SRQ0.

Here Tx is thread-x, for example, T0 is thread-0, T1 is thread-1, T2 is thread-2, and T3 is thread-3. It should be noted that although the examples herein use four threads in the MT mode, in other examples, the MT mode may include execution of a different number of threads concurrently, such as 8, 16 or any other. In one or more examples, the number of threads in the MT mode is configurable. Further, in the examples herein the LSU 104 uses two store pipes ST0 and ST1, however in other examples, the number of store pipes may be different, for example 3, 4, 8, and so on. In one or more examples, the SRQR 220 is partitioned into as many partitions as the number of store pipes.

Each entry of the SRQ 220 contains a store TID(0:1), an ERT ID(0:6), EA(44:63), and RA(8:51). To detect LHS, the LSU uses the {Store Tid, EA(44:63)}, thus eliminating RA LHS alias check. The ERT ID is used to "catch" EA(44:63) partial match mis-speculation. The SRQ entry has the RA(8:51), which is translated at store agen, and is only used when sending store requests to the L2 (store instruction drained, not issued). Each SRQ entry also has a "Force Page Match" bit. The force page match bit is set when an ERT ID is invalidated that matches the SRQ entry ERT ID. The SRQ can detect LHS involving any entry with Force Page Match=1. For example, LHS against an entry with Force Page Match=1 causes a reject of the load instruction. Further, a store drain forces a miss in the L1 cache if Force Page Match=1 for the SRQ entry. This works in tandem with "Extended store hit reload" LMQ actions.

For example, for an LMQ, an LMQ Address Match={ERT ID, EA Page Offset(xx:51), EA(52:56)} match. Further, a "Force Page Match" bit of each LMQ entry is set (=1) when an ERT ID is invalidated that matches the LMQ Entry ERT ID. The LMQ rejects a load miss if a valid LMQ entry[x]ForcePageMatch=1 and Ld Miss EA[52:56]=LMQEntry[X]EA(52:56). Further, the LMQ has an extended store hit reload. For example, LMQ suppresses reload enable if Reload EA(52:56)=SRQEntry[X] EA(52:56) and SRQEntry[X]ForcePageMatch=1. Alternatively, or in addition, LMQ suppresses reload enable if LMQEntry[X] EA(52:56)=StDrain EA(52:56) and StDrainForcePageMatch=1.

The LSU 104 depicted collapses a Store Data Queue (SDQ) as part of the SRQ 220 itself to further save chip area. The operands are stored in an entry of the SRQ itself if the operand size is less than the SRQ entry size, for example 8 bytes. In case of wider operands, such as vector operands, for example are 16 bytes wide, the SRQ stores the operands using two consecutive entries in the SRQ 220 in MT mode. In ST mode, the wider operands are stored in the SRQ0 and SRQ1, for example 8 bytes each.

The SRQ 220 queues operations of type stores, barriers, DCB, ICBI or TLB type of operations. A single s-tag is used for both store_agen and store_data. The SRQ 220 handles load-hit-store (LHS) cases (same thread only). For example, all loads issued are checked by the SRQ 220 to ensure there are no older stores with a data conflict. For example, the data conflict is detected by comparing loads EA and data byte flags against older stores in the SRQ EA array.

SRQ entries are allocated at dispatch where the dispatched instruction tags (itags) are filled into the correct row. Further, SRQ entries are deallocated on store drain. In one or more examples, the itag arrays hold "overflow" dispatches. For example, information is written into the itag array at dispatch if the row in the SRQ that is desired, say SRQ entry x is still in use. When, the SRQ entry x is deallocated, its corresponding row in the SRQ overflow itag structure is read out and copied into the main SRQ itag array structure (read of the overflow itag structure gated by whether there are any valid entries in the overflow itag array for a given thread/region). The main SRQ 0/1 itag array is processed by the CAM ports (or ½ cammed in SMT4) to determine which physical row to write into upon store issue, so that the ISU issues stores based on the itag. The SRQ 220 sends to the ISU, the itag when a store drains & deallocates.

Figure 4:
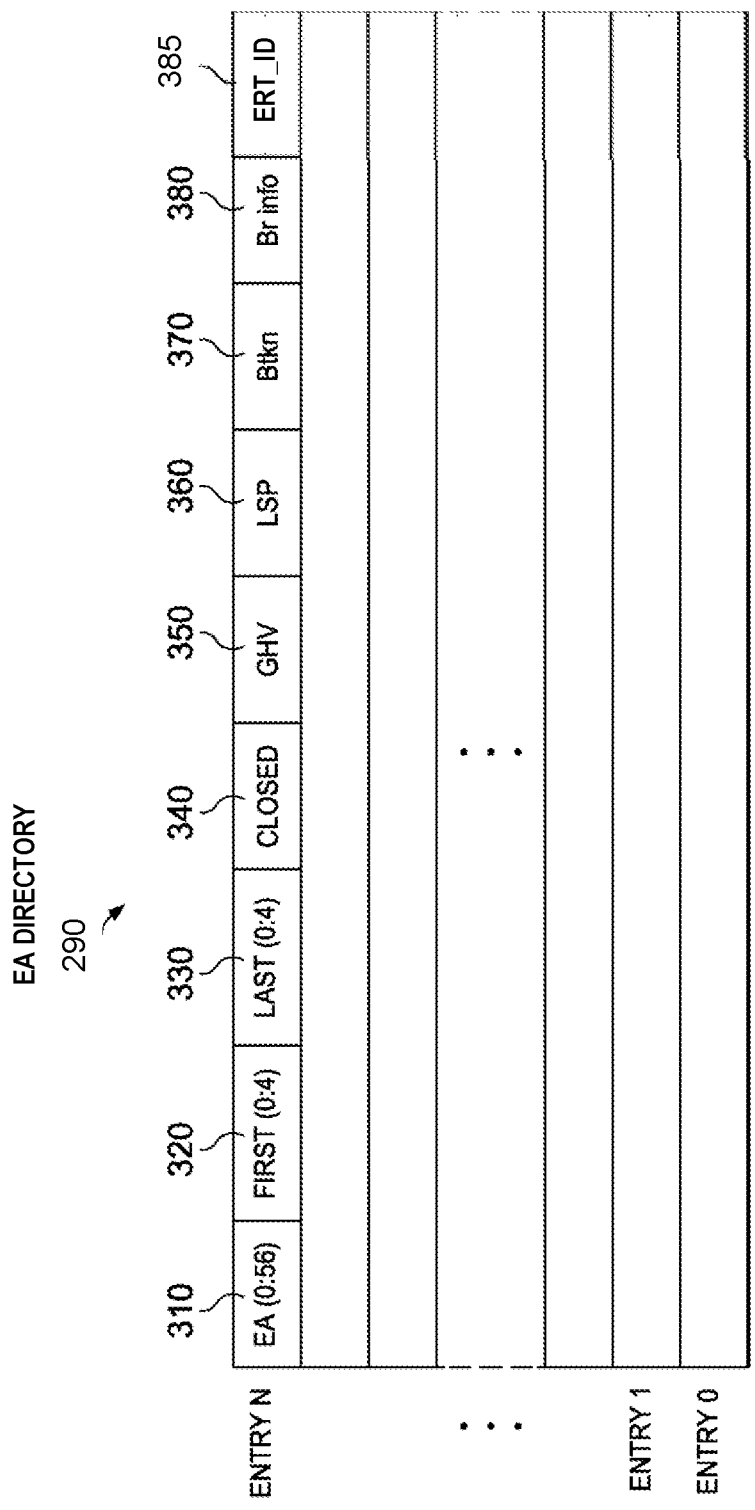
FIG. 4 is an exemplary block of an effective address directory (EAD) structure (L1 cache) in accordance with one illustrative embodiment.

FIG. 4 is an exemplary block of an effective address directory structure (L1 cache) 290 in accordance with one illustrative embodiment. In one or more examples, the EAD is part of the LSU 104. As shown in FIG. 3, the EAD 290 is comprised of one or more entries, e.g., entry 0 to entry N, with each entry comprising a plurality of fields of information regarding a group of one or more instructions. For example, in one illustrative embodiment, each entry in the EAD 290 may represent between 1 and 32 instructions. Entries in the EAD 290 are created in response to a fetch of an instruction that is in a new cache line of the processor cache, e.g., the L2 cache 260 in FIG. 2. The entry in the EAD 290 is updated as additional instructions are fetched from the cache line. Each entry of the EAD 290 is terminated on a taken branch (i.e. a fetched branch instruction from the cache is resolved as "taken"), cache line crossing (i.e. the next fetched instruction is in a different cache line from the current cache line), or a flush of the processor pipeline (such as when a branch misprediction occurs or the like).

As shown in FIG. 3, the fields of the EAD 290 entry comprise a base effective address 310, a first instruction identifier 320, a last instruction identifier 330, a closed identifier 340, a global history vector field 350, a link stack pointer field 360, a branch taken identifier 370, and a branch information field 380. The EAD 290 is organized like an L1 data cache. Set associative organization. For instance, in in one or more examples, it is 32 indexes, addressed by EA(52:56) by 8 ways, selected with EA(0:51).

The base effective address 310 is the starting effective address (EA) of the group of instructions. Each instruction in the group of instructions has the same base EA and then an offset from it. For example, in one illustrative embodiment, the EA is a 64 bit address comprising bits 0:63. The base EA may comprise, in one illustrative embodiment, bits 0:56 of this EA with bits 57:61 representing the offset from the base EA for the specific instruction within the group of instructions. Bits 62 and 63 point to a specific byte of each instruction. In the illustrative embodiment, each address references an instruction that is 32 bits long (i.e. 4 bytes), where each byte in memory is addressable. An instruction cannot be further divided into addressable subcomponents, and thus an instruction address will always have bits 62 and 63 set to zero. Therefore, bits 62 and 63 do not need to be stored and can always be assumed to be zero by the EAD.

The first instruction identifier field 320 stores the effective address offset bits, e.g., bits 57:61 of the EA for the first instruction in the group of instructions to which the EAD 290 entry corresponds. A combination of the base EA from field 310 and the effective address offset bits in the first instruction identifier field 320 provides the EA for the first instruction in the group of instructions represented by the EAD 290 entry. This first field 320 may be used, as discussed hereafter, for recovering a refetch address and branch prediction information in the event that the pipeline is flushed, for example.

The last instruction identifier field 330 stores the effective address offset bits, e.g., bits 57:61 of the EA, for the last instruction in the group of instructions to which the EAD 290 entry corresponds. EAD logic updates this field as additional instructions in the group of instructions represented by the EAD 290 entry are fetched. The EAD logic discontinues updating of this field 330 in the particular EAD 290 entry in response to the EAD 290 entry being closed when a cache line crossing or taken branch is found. This field will remain intact unless a pipeline flush occurs that clears out a portion of the EAD entry. In such cases, the EAD logic updates this field to store the effective address offset bits of the instruction that is now the new last instruction in the entry as a result of the flush. This field is ultimately used for completion, as discussed hereafter, to release the entry in the EAD 290.

The closed identifier field 340 is used to indicate that the EAD 290 entry has been closed and no more instruction fetches will be made to fetch instructions for the instruction group corresponding to the EAD 290 entry. An EAD 290 entry may be closed for a variety of different reasons, including a cache line crossing, a branch being taken, or a flush of the pipeline. Any of these conditions may result in the value in the closed field 340 being set to indicate the EAD entry is closed, e.g., set to a value of "1." This field 340 is used at completion to release an entry in the EAD 290, as discussed in greater detail hereafter.

The global history vector field 350 identifies the global history vector for the first instruction fetch group that created the entry in the EAD 290. The global history vector is used to identify a history of whether branches were taken or not taken, as discussed in greater detail hereafter. The global history vector is used for branch prediction purposes to help in determining, based on the recent history of branches being taken or not taken, whether a current branch is likely to be taken or not.

The link stack pointer field 360 identifies the link stack pointer for the first instruction fetch group that created the entry in the EAD 290. The link stack pointer is another branch prediction mechanism that will be described in greater detail hereafter.

The branch taken field 370 indicates whether the group of instructions corresponding to the EAD 290 entry had a branch instruction in which the branch was taken. The value in the branch taken field 370 is updated in response to a branch instruction of the instruction group represented by the EAD 290 entry being predicted as taken. In addition, once a branch in the instructions of the EAD 290 entry is taken, the EAD 290 entry is also closed by writing the appropriate value to the closed field 340. Since the branch taken field is written speculatively at prediction time, it may need to be replaced with the correct value when the branch is actually executed. For example, a branch could be predicted as not taken, in which case a "0" would be written into the branch taken field. However, later in execution, the branch could be found to be taken, in which case the field must be corrected by writing it to a value of "1". The second write only occurs if the branch was mispredicted.

The branch information field 380 stores miscellaneous branch information that is used for updating branch prediction structures when a branch resolves, or architected EA state when a branch instruction completes.

The ERT_ID field 385 stores an index into the ERT table (described further), which identifies a corresponding ERT entry. When an ERT entry is invalidated, the associated ERT_ID is invalidated and it will also invalidate all associated entries in L1 cache and L1 D cache.

Entries in the EAD 290 are accessed using an effective address tag (eatag) that comprises at least two parts: base eatag and an eatag offset. In one illustrative embodiment, this eatag is a 10 bit value, which is relatively much smaller than the 64 bit effective address. With a 10 bit eatag value, and a EAD 290 having a size of 14 entries, in one exemplary implementation, the eatag is comprised of a first 5 bits, referred to as the base eatag, for identifying an entry within the EAD 290 and a second 5 bits, referred to as the eatag offset, for providing the offset of the specific instruction within the group of instructions represented by the entry in the EAD 290. A first bit in the 5 bits identifying the entry within the EAD 290 may be used as a wrap bit to indicate whether a wrap occurred when going from the topmost entry to the bottom most entry of the EAD 290. This may be used for age detection. The second through fifth bits of the 5 bits identifying the entry within the EAD 290 may be used to index into the EAD to identify the base EA of the instruction, i.e. EA(0:56). The 5 bit offset value may be used to provide, for example, bits 57:61 of the particular instruction's effective address. This example eatag is illustrated below:

eatag(0:9)=row(0:4)||offset(0:4)

row(0): Wrap bit for the EAD indicating whether or not a wrap occurred when going from the topmost entry to bottom most entry of the EAD.

row(1:4): Index into 14-entry EAD used to determine EA(0:56) of the instruction.

offset(0:4): Bits 57:61 of the instruction's EA.

Figure 5:
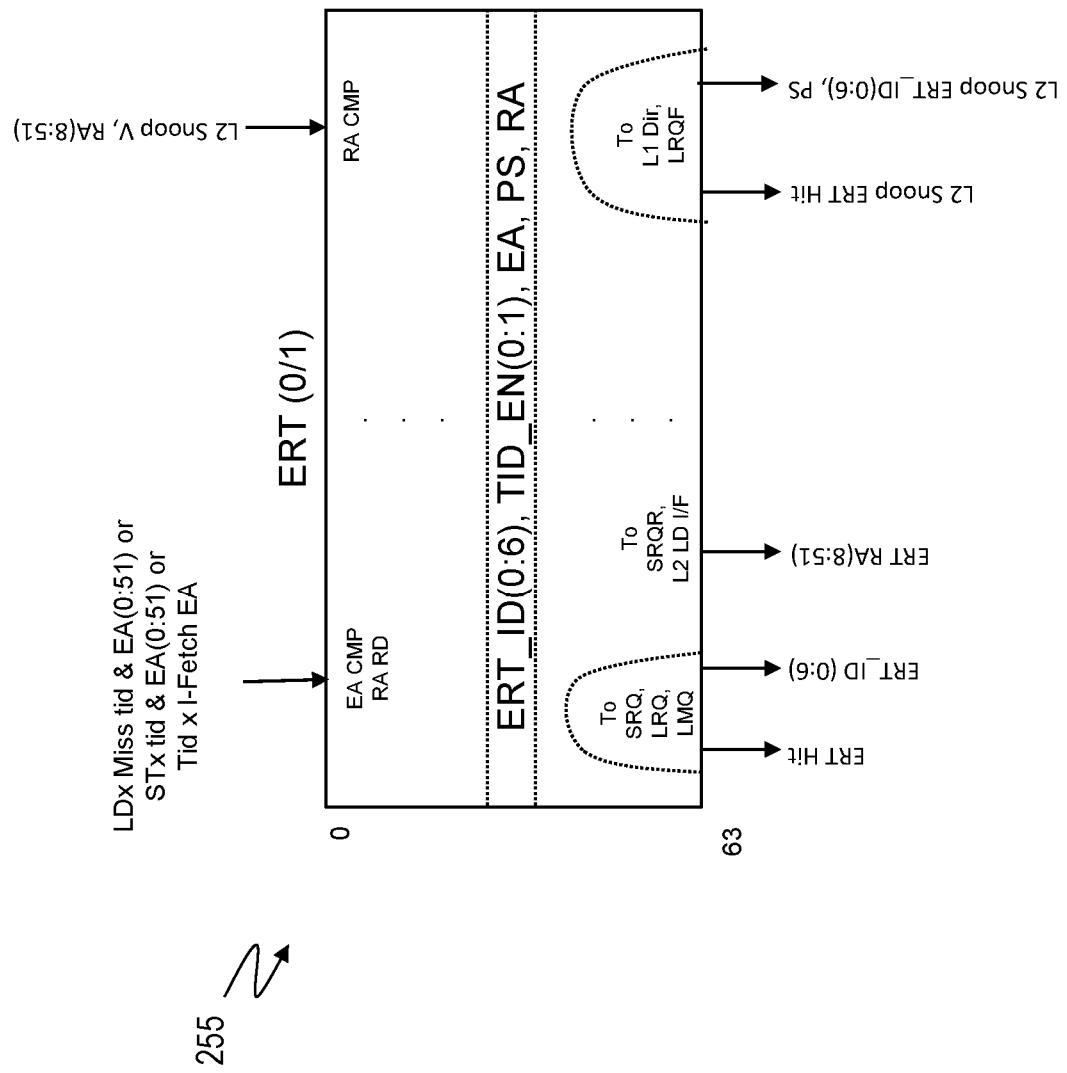
FIG. 5 is an exemplary block of an effective real translation (ERT) table structure in accordance with one illustrative embodiment.

FIG. 5 depicts an example effective real table (ERT) structure according to one or more embodiments of the present invention. In one or more examples, the ERT 255 includes 128 total entries, however it should be noted that the total number of entries can be different in other examples, and further that the number of entries may be selectable or programmable. Further, in case the LSU 104 uses multiple pipes, each pipe has a separate partition in the ERT 255. In one or more examples, the predetermined maximum number of entries in the ERT 255 are equally divided among the pipes. For example, in the case of two pipes, (i.e., two instructions separately in parallel) the LSU maintains two partitions of the ERT 255 with 64 (half) entries each, for example an ERT0 and an ERT1. For example, LD0 and ST0 use the ERT0 and LD1 and ST1 use the ERT1. In ST mode, a first partition of the ERT 255 is used with the other being a copy of the first partition, for example ERT0 being used with ERT1 a copy of ERT0. Alternatively, in one or more examples, if the LSU uses a single load pipe and a single store pipe, the entire ERT 255 is used as a single partition. The description below describes any one partition of the ERT 255, unless specified otherwise.

The ERT 255 includes a valid ERT entry, in general, exists for any page active in the L1 I-Cache or D-Cache directory (EAD 290) or an SRQ entry or an LRQF entry or an LMQ entry. In other words, ERT 255 is a table of all active RPN's in the LSU and IFU (L1 DC, SRQ, LRQE, LRQF, LMQ, IC). In one or more examples, if the processor 106 is operating in ST mode, all entries in the ERT 255 are used for the single thread that is being executed. Alternatively, in one or more examples, the entries in the ERT 255 are divided into sets, and in ST mode, each set has the same content. For example, if the ERT 255 has 128 total entries, and supports maximum two threads, when the processor operates in ST mode, the ERT 255 includes two sets of 64 entries each, and the two sets have the same content.

Alternatively, if the processor 106 is operating in the MT mode, the ERT entries are divided among the threads being executed. For example, in case of two threads, the ERT entries are divided into two equal sets, a first set of entries associated with a first thread, and a second set of entries associated with a second thread. For example, 1 copy for LD0 pipe L1 misses, ST0 pipe launches, T0/T2 I-Fetches: ERT0, which handles T0 in SMT2 mode and T0/T2 in SMT4 mode; and 1 copy for LD1 pipe L1 misses, ST1 pipe launches, T1/T3 I-Fetches: ERT1, which handles T1 in SMT2 mode and T1/T3 in SMT4 mode.

In one or more examples, each ERT entry includes at least the following fields ERT fields, ERT_ID (0:6), Tid_en (0:1), Page Size (0:1), EA (0:51), and RA (8:51). The ERT_ID field is a unique index for each ERT entry. For example, the ERT_ID may include a sequential number that identifies the ERT entry. The ERT_ID is stored in the ERT_ID field 285 of the EAD 290, and other data structures used by the LSU. The TID_en field indicates if the entry is enabled for being used in MT mode, and in one or more examples a the thread identifier of the instruction that is using the ERT entry. Further the Page Size indicates the memory page size to which the ERT entry refers. The RA includes a real address associated with the ERT entry.

The LSU refers to the ERT 255 only in cases where the RA is to be used for completing execution of an instruction. As described herein, the ERT 255 is consulted by the LSU for the following four functions, 1. Ifetch, Load or store missing the L1 cache; 2. stores from another thread within the core; 3. Snoop (XI) from another core; and 4. TLB and SLB invalidation.

In the first case of Ifetch, Load or store missing the L1 cache, the EA and thread_id are used to index into the ERT 255 and the RA from the corresponding ERT entry is sent to the L2 cache if a valid ERT entry exists. In case of an ERT miss, that is a valid ERT entry does not exist for the EA and thread_id, the SLB/TLB is used.

In the second case, where stores from another thread within the core, a store drained from the SRQ checks the ERT 255 and ERTE table (described further) for a hit from another thread. If there is no hit from a different thread, then there is no load from another thread that is using the same RA. If there is a hit from a different thread using the same RA, the LSU checks the LRQ. Although, rare, in case a hit from another thread exists if the RA is used by another thread(s). Accordingly, the LSU looks up the ERT table 400 to find the relevant EA(s) for the common RA. The EA(s) are then used to look into the LRQ for a match (reject any store issue in that cycle). LRQ is partitioned per thread, so the LSU only looks into relevant thread's LRQ. If there is matching load(s) in the LRQ, the LSU flushes the oldest of the matching load(s).

In the third case of a snoop from another core of the processor, the LSU works similar to the second case, and checks for a hit from any of the other threads being executed. In case the TLB/SLB are invalidated, the ERT 255 is also invalidated.

Figure 6:
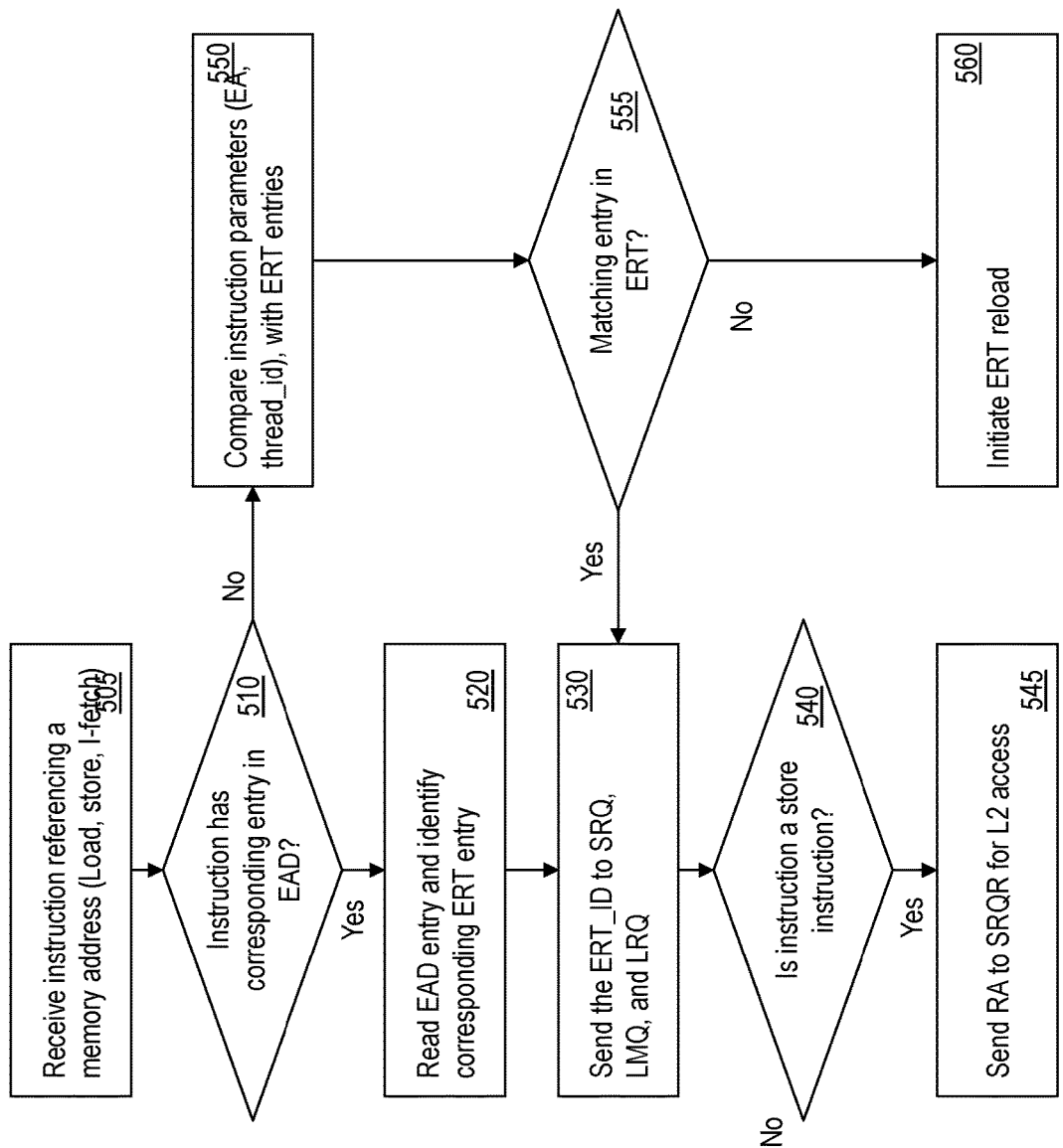
FIG. 6 illustrates a flowchart of an example method for accessing memory for executing instructions by an LSU according to one or more embodiments of the present invention.

FIG. 6 illustrates a flowchart of an example method for accessing memory for executing instructions by an LSU according to one or more embodiments of the present invention. The instruction may be a load, a store, or an instruction fetch for the OoO processor 106. Upon receiving the instruction, the LSU uses parameters of the instruction to check if the EAD 290 has an entry corresponding to the instruction, as shown at 505, and 510. In one or more examples, the parameters used for checking include thread identifier, page size, EA, among others.

If the LSU experiences an EAD hit in the EAD 290, that is the EA of the instruction matches an entry in the EAD table 300, the LSU reads the contents of the matching EAD entry to determine a corresponding ERT entry, as shown at 520. Each EAD entry contains the ERT_ID (0:6) field 285. As described earlier, when an ERT entry is invalidated, the associated ERT_ID is invalidated, which also invalidates all associated entries in the EAD table 300. Accordingly, an EAD hit implies an ERT hit because using the ERT_ID field 285, an ERT entry can be found for the load/store instruction. Accordingly, in case of the EAD hit, after identifying the corresponding EAD entry, the LSU reads out ERT_ID from the EAD entry and sends to SRQ, LMQ, and/or LRQF, as shown at 530. The SRQ, LMQ, and/or LRQF use the EA from the EAD entry identified. In case of store instructions, which use RA, the RA from the ERT entry is read out for L2 access, as shown at 540 and 545. Thus, because the RA is not used anywhere else but the store instructions, core implementing the technical solutions herein is called EA-only core.

Now consider the case where the instruction misses the EAD 290, that is the EA of the instruction does not have a matching entry in the EAD table 300. The thread_id and EA are compared against each entry from the ERT 255, as shown at 550. If an ERT hit occurs, that is an ERT entry matches the parameters, the LSU reads out the RA (8:51) from the ERT entry, as shown at 555, and 530. For load requests the LSU sends the RA to the L2 cache for access, 530. For store instructions, the LSU stores the RA in the SRQ and then sends the RA to the L2 cache when the store drains to the L2 cache, as shown at 540-545.

If ERT miss occurs, the LSU initiates a reload for the ERT 255, as shown at 555 and 560. Further, ERT entry replacement is initiated. The ERT entry replacements are LRU based, and the LSU ensures to track synonyms within out-of-order window during this process.

Thus, by implementing the above method for a load, if there is an EA-hit in the EA-based L1 directory, then no address translation is performed. This improves on the typical processor where, the L1 directory is RA-based, which in case of a miss at the L1 directory for a load, causes the EA to be sent to an ERAT table for translation to get the RA that is sent to the L2 directory and beyond.

Further, for stores, with the method described herein the LSU has to go through the ERT table to determine the RA that is then stored in the SRQR to drain down to the caches (L1, L2, memory) when the store gets drained out of the SRQ. The SRQR holds all the RA for the stores. The RA is only stored for draining to the Nest (that is, L2, memory, and other units of the memory subsystem). The RA is not used for load-hit-store, store-hit-load or load-hit-load type of out-of-order execution hazard detection as it is done in the typical solutions. The RA calculation for stores happens before the store is completed, because after completion the LSU is unable to process any interrupt for the store (store can generate an address translation related interrupt, which is to be processed before the store is completed). Here the RA calculation is done when the store is issued (from the SRQR), thus preventing the LSU from having to perform the address translation. Thus, stores get issued and executed out-of-order, and then get completed in-order, and subsequently the stores get drained from the SRQ in-order. Until a store is drained, no other thread or core knows about the store (only the current thread knows). After the store is drained from the SRQ, it is written into the L1 (if the line already exists in L1) and L2 caches (if caching is enabled) and at that point the store is known to all other threads and cores in the system 100.

For instruction fetches that miss the EA-based L1 I-Cache, the EA is translated to RA using the ERT 255 and the RA is sent to the Nest to fetch the I-Cache line. Here, the LHS (load-hit-store), SHL (store-hit-load) and LHL (load-hit-load) are all determined based on the EA and the ERT-Index stored with the directory entries in the EA-based L1 cache (EAD 290). All entries in the EAD table 300 have their translation valid in the ERT table 400, which can be used once LHS, SHL, and LHL are determined. If an ERT entry is invalidated, then the corresponding L1 cache entries are invalidated.

The LRQF, which is the load-reorder-queue, ensures that all load operations are tracked from dispatch to complete. When a load is rejected (for cache miss, or translation miss, or previous instruction it depends on got rejected) the load is taken out of the issue queue and placed in the LRQE for it to be re-issued from there.

Figure 7:
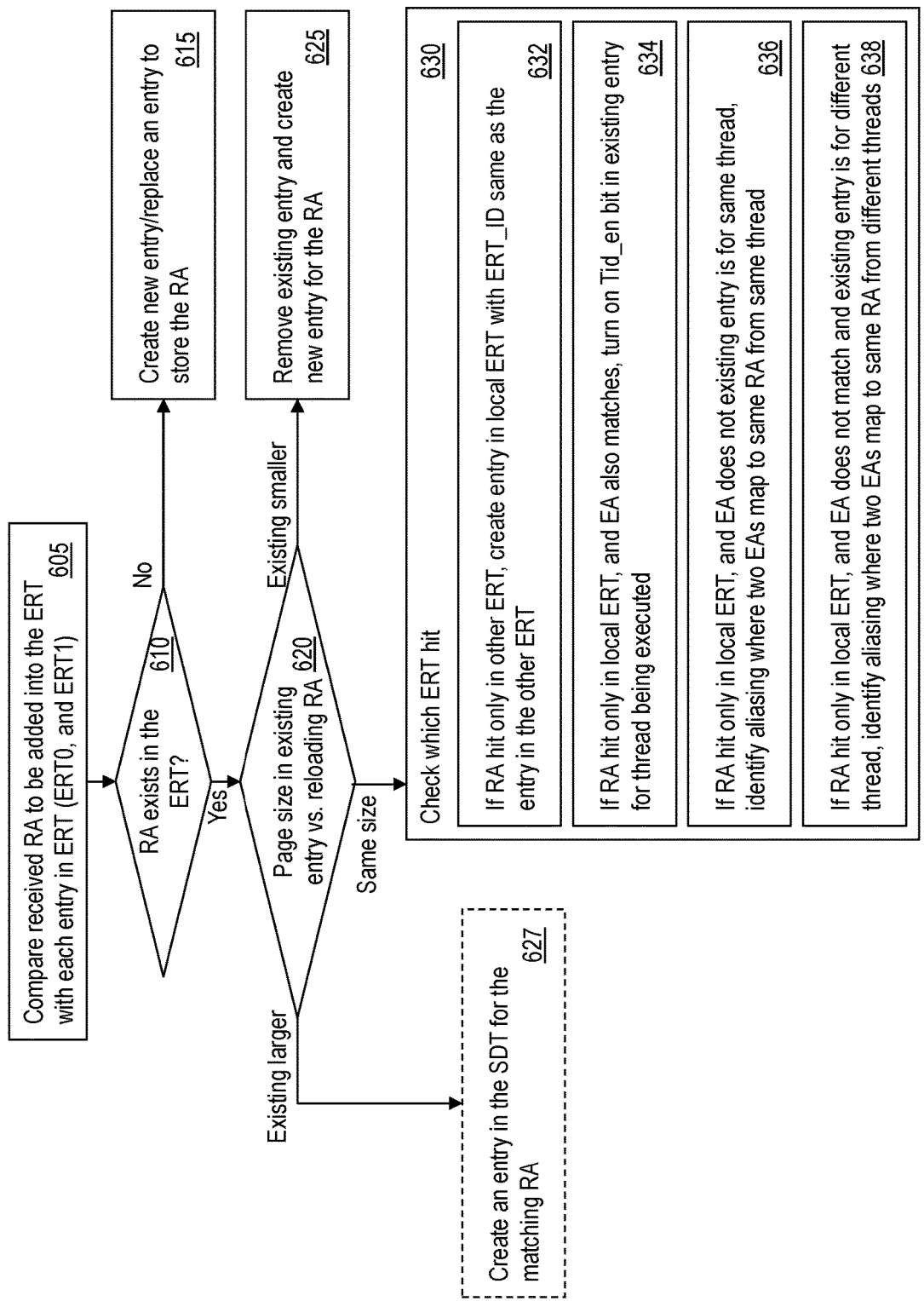
FIG. 7 illustrates a flowchart for a method for reloading the ERT according to one or more embodiments of the present invention.

FIG. 7 illustrates a flowchart for a method for reloading the ERT according to one or more embodiments of the present invention. An ERT reload causes an entry in the ERT to be created or updated in response to and based on the ERT miss. The ERT receives the RA which is to be added into the ERT 255 and compares the RA with each entry in the ERT0 and ERT1, as shown at 605. If the RA does not exist in the ERT 255, and if a new entry can be created, the ERT 255 creates a new entry with a new ERT_ID to store the RA, as shown at 610 and 615. The new entry is created in either ERT0 or ERT1 based on the executing thread being the first thread or the second thread, respectively. In case the processor is operating in ST mode, the ERT0 is updated. If the ERT 255 does not have an open slot for a new entry, an existing entry is replaced based on least recently used, or other such techniques, as shown at 615.

If the existing entry(ies) in the ERT 255 is found with the same RA as the received RA (reloading RA), the ERT 255 compares page size(0:1) of the existing entry(ies) with that for the received RA, as shown at 620. If the page size of the existing entries is smaller than that for the reloading RA, the existing entries for that RA are removed from the ERT 255, and a new entry with a new ERT_ID is added for the RA with the larger page size, as shown at 625. If the existing entry has a same or larger page size, and if the implementation uses an SDT, an entry is created in the SDT for the reloading RA, as shown at 627. It should be noted that this operation may not be performed in case the LSU is using an ERTE.

If the page size of the existing entries is the same size as the reloading RA, the ERT 255 checks if the existing entry is on the local ERT for the executing thread, as shown at 630. A local ERT in this case refers to the ERT being associated with the thread that is being executed, for example ERT0 for first thread and ERT1 for a second thread. If the RA hit is in the other ERT, that is the ERT that is not the local ERT, the ERT 255 creates a new entry in the local ERT with ERT_ID matching that in the non-local ERT, as shown at 632. For example, if the RA hit is in ERT1 for instruction executing by thread-0, an entry is created in the ERT0 with matching ERT_ID as the entry in the ERT1.

If the RA hit is on the local ERT instance, and if the EA also matches, because both EA and RA matched with an existing entry, but there was a ERT miss for this thread prompting the ERT reload, the ERT deems that this indicates that the two threads are sharing the same EA-RA mapping (with the same page size). Accordingly, the tid_en(0) or tid_en(1) bit in the existing matching entry for the bit corresponding to the reload thread is turned ON to indicate this case, as shown at 634.

If the RA hit is on local ERT instance, the EA does not match the existing entry, and if the existing entry is for the same thread as the reloading RA, the ERT identifies the aliasing case where two different EA maps to the same RA from the same thread, as shown at 636. If the processor is using an SDT-based implementation, a synonym entry is installed in the SDT that maps to the ERT ID, EA Offset (40:51) of the existing matching entry. If the processor uses an ERTE-based implementation, the LSU rejects the instruction until it is non-speculative, upon which it evicts the entry from the ERT and adds an entry in the ERTE.

If the RA hit is on the local ERT instance, the EA does not match the existing entry, and if the existing entry is for a different thread, the ERT identifies the aliasing case where two EAs map to same RA from different threads, as shown at 638. If the processor is using an SDT-based implementation, a synonym entry is installed in the SDT that maps to the ERT ID, EA Offset(40:51) of the existing matching entry. If the processor uses an ERTE-based implementation, a new local ERT entry is added using a new ERT ID, with tid_en valid only for the thread that had the ERT miss.

The above method facilitates that in the ERTE-based implementation, two threads that have the same RA but different EA use two different ERT entries; and in SDT-based implementation, when two threads have the same RA but different EA, one of the translation uses the ERT entry and the other will use the SDT entry. Thus, the ERT entries facilitate the case where the same EA, and same RA is used across different threads by having a tid_en field in the ERT entry. For example, Tid_en(0:1)={tid 0 en, tid 1 en} on ERT0 instance; and Tid_en(0:1)={tid 1 en, tid 1 en} on ERT1 instance. Further, the ERT entry facilitates the case where same EA correspond to different RAs across different threads by having multiple entries in the ERT0 and ERT1 with their respective thread identifiers. The ERT entries also support the case with different EAs corresponding to the same RA (either same or different thread cases). Two cases are now described based on whether the implementation uses ERTE or SDT, both are described further.

In case the LSU uses the implementation using SDT, the LSU installs an entry in the SDT (synonym detection table) instead of the ERT 255 when a new instruction is detected with different EA corresponding to the same RA at ERT reload time. The SDT hits relaunch with the original (or earlier) ERT entry's EA. If new synonym page size is bigger than the page size in the existing ERT entry with matching RA, then the existing ERT entry is replaced by the new synonym (with the larger page size) instead of installing a synonym in the SDT. The old ERT entry is eventually reinstalled as synonym in the SDT.

Alternatively, in case the LSU uses the implementation using ERTE, if the instructions with different EAs corresponding to the same RA are for different threads then the LSU install a new entry in the ERT table with the appropriate Tid_en enabled. If the instructions are for the same thread, then the LSU rejects the load/store until it is non-speculative. After that point, the LSU removes the existing ERT entry and places it in the ERTE table, tagged with the ITAG of the youngest instruction in-flight from the thread. The LSU further installs the new EA-RA pair in the ERT table 400. This ensures that a situation when two different EAs map to the same RA from the same thread does not occur.

Further, referring back to the ERT cases, consider the case where the LSU receives a snoop from another core from the processor 106. The snoop can be from a different core in the system (snoop indicates another core or thread, changed the data at the same real address). The LSU also checks stores from a thread within the core as a potential snoop to the other threads within the core. All snoops (from other cores) or stores (from other threads within the core) come with a RA. In such cases, the LSU reverse translates the RA to determine corresponding EA, ERT_ID, and page size based on the ERT 255. The LSU compares this information with the ERT_ID, PS, EA(40:56) stored in each of the following structures to detect a snoop hit and take the appropriate action. For example, if a snoop hit is detected in LRQF Entry, the LSU indicates a potential load-hit-load out of order hazard. If a snoop hit is detected in the EAD 290, the LSU initiates an L1 invalidate, if the snoop is from a different core. If the store is from another thread for a shared line, then the line automatically gets the new store and is updated.

Accordingly, the technical solutions described herein facilitate a reduction in chip area of the LSU by tracking only one address, EA. Further, the technical solutions enable the processor cores to run in a 2 load and 2 store mode with partitioned load store queues, further reducing CAM ports for the translation, and in turn power consumption of the translations. Further, by using only the EA, the technical solutions have advantages such that translation to RA is not performed in a load/store path, unless an EAD miss occurs. Further, detecting hazards such as LHL, SHL, LHS, and suppressing DVAL in time do not cause timing problems. Because the LSU only uses the EA detecting the LHS, SHL, LHL can miss when two different EAs map to the same RA. The technical solutions described herein address such technical challenges by using the EA and ERT index from the EAD. Further, upon detecting EA synonyms, the LSU handles the instructions by using a SDT or an ERTE table for the instructions in the OoO window.

If the LSU uses an SDT (as opposed to an ERTE), and if a snoop hit exists in the LMQ, the LSU also updates the LMQ entry to not store in L1 Dcache, the SRQ Entry is not used for snoops in SRQ, only used for LHS EA miss RA hit style checking, and a new SDT entry is created for the snoop hit.

Figure 8:
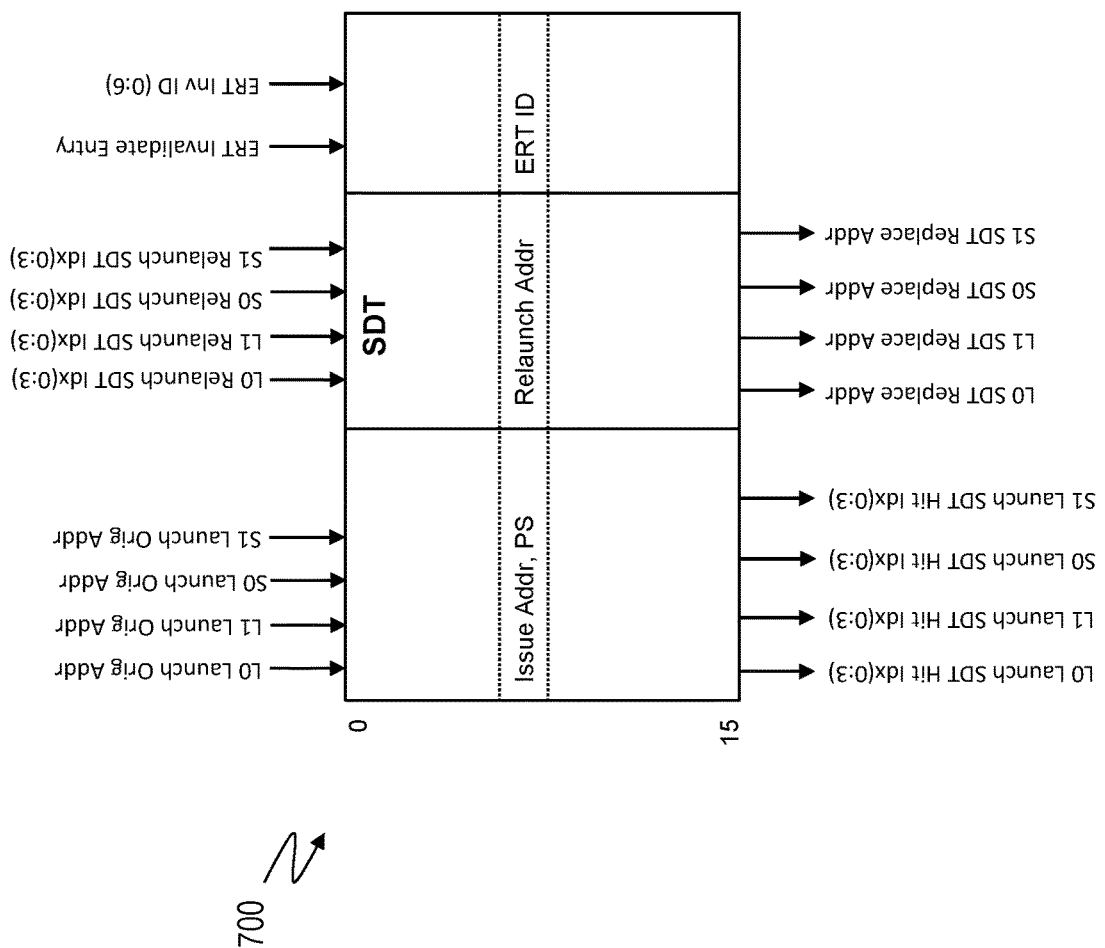
FIG. 8 depicts an example structure of a synonym detection table (SDT) according to one or more embodiments of the present invention.

FIG. 8 depicts an example structure of a synonym detection table (SDT) 700 according to one or more embodiments of the present invention. The depicted example shows a case with 16 entries, however it should be noted that in other examples, the SDT 700 may include a different number of entries than this example. The SDT 700 is common across the multiple threads and pipes of the LSU 104. For example, LD0, LD1, ST0, and ST1, all access entries in the SDT 700, and the SDT 700 do not have separate partitions for each.

An entry in the SDT 700 includes at least the fields of issue address {Issue Tid(0:1), Issue EA(0:51)}, page size(0:1) (e.g. 4 k, 64 k, 2 MB, 16 MB), and relaunch address {EA(40:51), ERT ID(0:6)}. The Tid (thread-identifier) field indicates which thread from the OoO processor is executing the instruction associated with the entry in the SDT 700. In cases of instructions where launches miss the L1, the LSU compares the instruction against SDT 700. If launched instruction gets a SDT hit on original address compare, the LSU rejects the instruction and relaunches the instruction with the corresponding replacement address from the SDT entry. For example, the LSU uses the replace Addr(40:51) for SRQ LHS, and "Force Match" the ERT ID in the execution pipeline.

An entry is added into the SDT 700 during the ERT reload as described herein. For example, during ERT reload, the reload RA is compared against valid ERT entries. If an ERT entry with matching RA already exists and it is not an EA hit case where just an additional tid_en bit is being set in the original ERT entry, then the EA(32:51) from the existing ERT entry is read, and an entry is installed into the SDT 700 instead of adding an entry to the ERT 255.

Because SDT 700 has limited number of entries, the entries are replaced. In one or more examples, the entries are replaced based on least recently used (LRU) techniques, or any other order. In one or more examples, if an SDT entry is replaced, a subsequent launch using the secondary address re-triggers the SDT entry installation sequence. Further yet, CAM clears SDT entry(s) with ERT ID matching an ERT entry invalidate.

Figure 9:
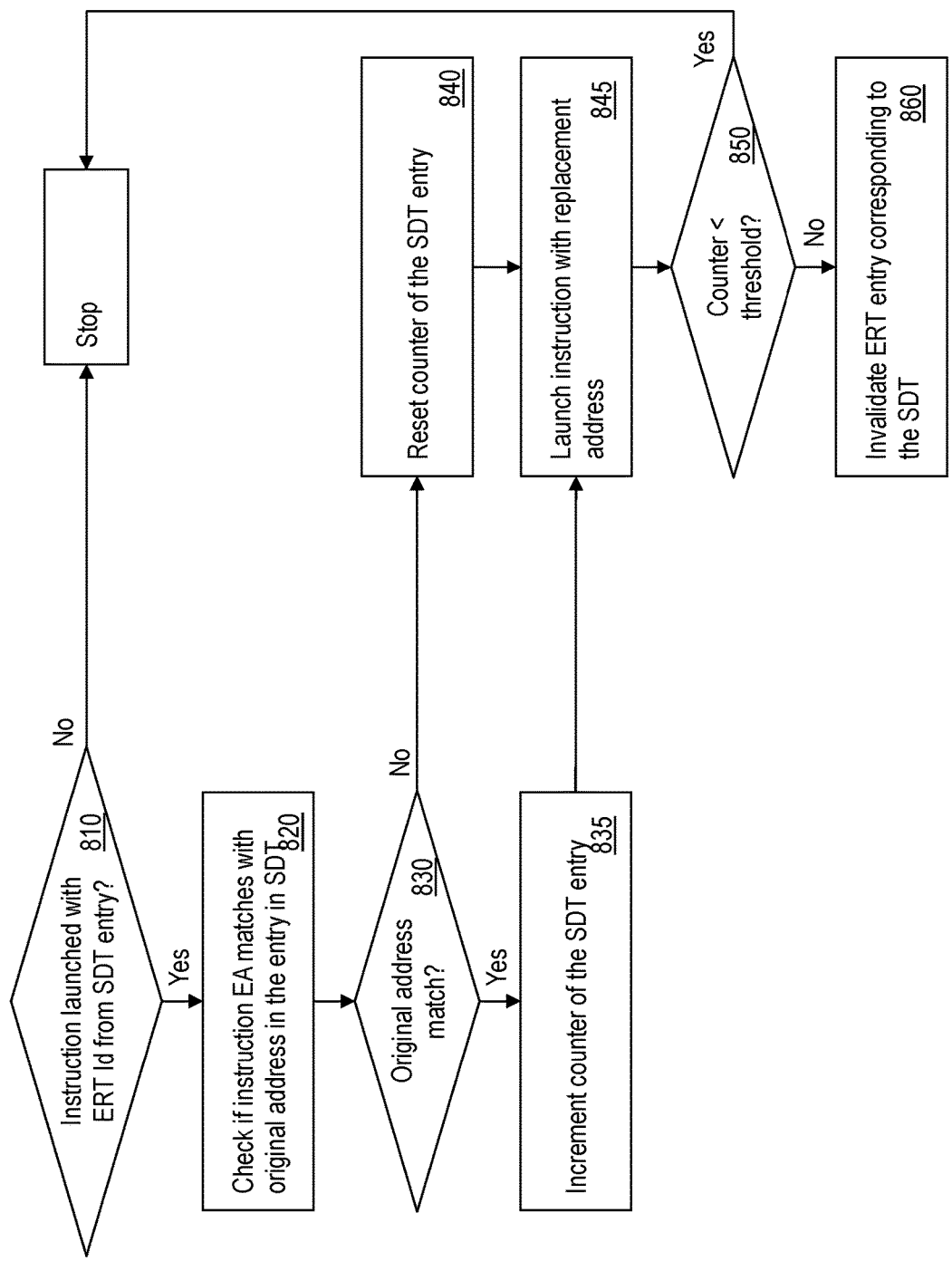
FIG. 9 illustrates a flowchart for a method for performing an ERT and SDT EA swap according to one or more embodiments of the present invention.

FIG. 9 illustrates a flowchart for a method for performing an ERT and SDT EA swap according to one or more embodiments of the present invention. In one or more examples, the LSU performs the swap in case of the ERT and SDT entries having the same page size. The swap improves the efficiency of the processor 106 for cases of different EAs corresponding to the same RA, on different instructions on the same or different thread. For example, consider two instructions x and y, such that EAx=>RAz, and EAy=>RAz. If the EAx misses ERT first, that is before EAy, the LSU installs an ERT entry with EAx mapping to RAz as described herein. Subsequently, when the EAy misses the ERT at a later time, the LSU CAMs the ERT with the RAz, gets an RA hit, and installs an entry in the SDT 700 with Original Address=EAy, Replace Address=EAx.

Now, if most subsequent accesses to RAz are with EAy, the LSU has to use the SDT more frequently than using the EAD itself. In one or more examples, the technical solutions to improve the efficiency of the LSU, by reducing such frequent trips to the SDT include providing an increment counter in each SDT entry. As depicted in FIG. 8, the LSU launches an instruction with an ERT ID that matches an ERT ID from an SDT entry, as shown at 810. If the SDT entry ERT ID matches, the LSU further compares the EA of the launched instruction with an original EA in the SDT entry, as shown at 820. If the SDT entry has an original address value that matches the EA from the instruction, the counter of the SDT entry is incremented, as shown at 830 and 835. In case the launched instruction has an EA different from the original address of the SDT entry, the counter of the SDT entry is reset, as shown at 840.

In one or more examples, the counter is a 4-bit field, implying a maximum value of 15. It should be understood that the field is of different length in other examples, and/or have different maximum value, which is used as a threshold. For example, after the instruction has been launched, the counter value is compared with the threshold, as shown at 845 and 850. If the counter is below the threshold, the LSU continues to operate as described. If the counter exceeds the threshold, or in some cases is equal to the threshold, the LSU invalidates the ERT entry corresponding to the SDT entry, as shown at 860. For example, the ERT entry with the ERT ID from the SDT entry is invalidated. The invalidation of the ERT entry causes the corresponding entries to be invalidated from the EA Directory, LRQF, LMQ, and SRQ.

Further, the LSU addresses a technical challenge of exceptions in a launched instruction requiring original EA to finish in the following manner. For example, consider the case where the launched instruction gets an SDT hit and wants to relaunch with replace address from the SDT entry instead of the original launch address, but an exception is taken that requires the original EA to finish. Such condition may occur in case of DAWR/SDAR, etc.

The LSU implementing the technical solutions described herein address such technical challenge by maintaining the original address in a queue in the LRQE. The LRQE also keeps an SDT hit flag (bit), an SDT Index(0:3) for each LRQE entry. When relaunching, the SDT index is read a cycle early to get the replace address. The LRQE further multiplexes between the LRQE entry address (original address) and the SDT replace address (read from the SDT) before relaunching. For exception cases, such as the above, where the original address is required to finish, the LRQE has an additional SDT hit override flag (bit) for each entry set on DAWR partial match, etc. The LRQE relaunches the case where there was an SDT hit that finishes with an exception and forces the original address to be launched. An SRQ relaunch is similar to the LRQE relaunch as described here, where the SDT hit override flag is used when it is determined before relaunch to finish with exception.

Figure 10:
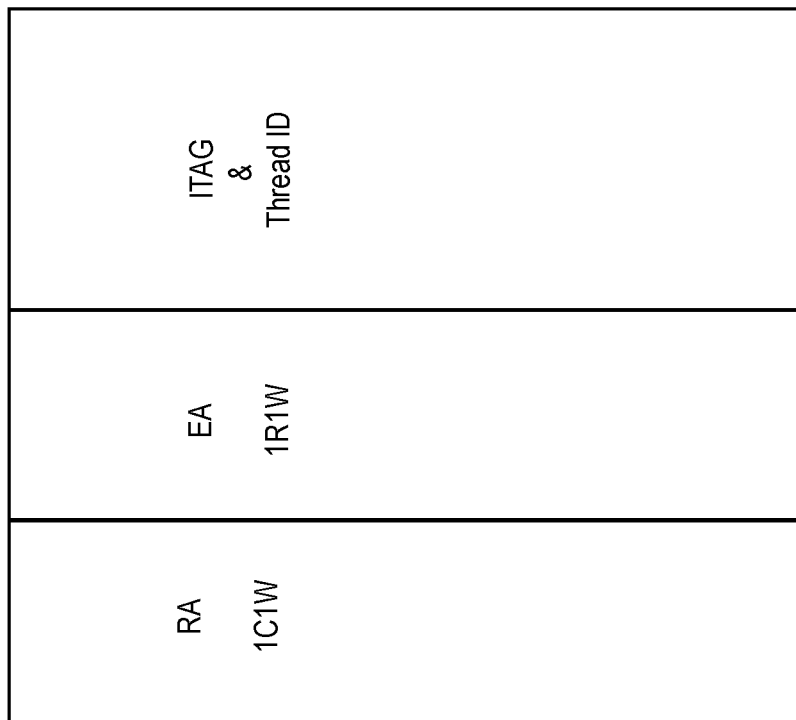
FIG. 10 depicts an ERT eviction (ERTE) table according to one or more embodiments of the present invention.
Figure 10:

FIG. 10 depicts an ERT eviction (ERTE) table 900 according to one or more embodiments of the present invention. The ERTE table 900 facilitates the LSU to keep track of evicted (or invalid) rows from the ERT 255. The ERTE table 900 further facilitates checking, when an entry is being created in the ERT 255, if there is a different EA for the same RA, on the same thread. The ERTE table 900 is shared by all concurrent threads. In one or more examples, part of the ERTE table 900 is reserved for NTC entries. An entry in the ERTE table 900 includes fields for a thread ID, an ITAG, an EA, and an RA. In one or more examples, the ERTE table entry may include additional fields. The thread ID may be a four bit field in one or more examples.

The ERTE table 900 can be viewed as a combination of two tables: ERT_EA and ERT_RA, with 1:1 correspondence between them. The ERT_EA table uses EA to CAM and the ERT RA table uses RA to CAM. In one or more examples, each table has 64 entries, although the number of entries may be varied/programmable in other examples. If an EA-RA translation is removed from the ERTE table 900, the relevant cache line from the EAD table 300 is invalidated as well. That way the ERT 255 is a superset of all the translation within a processor core (except the TLB, SLB).

The ERTE table 900 keeps track of all translations that are not in ERT 255, but used by an instruction in flight. The ERTE table entries are tagged with the youngest possible instruction that may have used an evicted entry. Due to OoO issue of load-store, the youngest ITAG of all active instructions in the OoO window is stored in the ERTE table 900. On a flush, the ITAG of the last survived instruction is stored to all valid entries. On a completion, all entries that have the same or older ITAG are freed up. When full, the ERTE table 900 block dispatches and waits for instructions to complete (and/or flush) and the table eventually becomes completely free. It should be noted that although examples described herein use the ITAG for tracking age of instructions launched, in other examples another tag (like EATAG, LSTAG, or the like), that monotonically increases and wraps may be used instead.

When a translation in the ERT 255 or EAD 290 is evicted/invalidated, the EA-RA of the evicted entry is added in the ERTE table 900, without last predetermined number of bits from the evicted entry, for example last 12 bits. Further, the entry in ERTE table 900 with the youngest valid ITAG for the same thread to which the evicted translation belongs is marked, for example using a flag (bit).

When a new address translation is performed (EA to RA), the LSU compares the RA against the ERT 255 to check if a different EA-to-RA from the same thread already exists in the ERT 255. If exists, then the LSU installs the new translation in the ERT 255 as a synonym. Thus, the ERT 255 (when using the ERTE) can have two entries that have different EAs pointing to the same RA for the same thread. Because synonyms of the in-flight instructions are not allowed, in one or more examples the LSU initiates a NTC+1 flush just to ensure forward progress.

A balance flush is a thread control mechanism which flushes a stalled and/or resource-consuming target thread entirely from the system to restore resource usage fairness or balance. The balance flush comprises a next-to-complete instruction flush (NTC+1) which flushes all instruction groups on a selected thread following the next-to-complete instruction group. The NTC+1 balance flush flushes the execution units, the global completion table, and the EAD for the selected thread. Threads are balance flushed only if a thread is stalled at dispatch. Balance flushes may be enabled or disabled using the <bf:1> field within the thread switch control register.

In one or more examples, entries in the ERTE are marked invalid after the OoO window execution is completed. It should be noted that an ERTE entry is marked valid when the ERTE entry is being written into with a new EA-RA translation pair being evicted from the ERT table 255.

Figure 11:
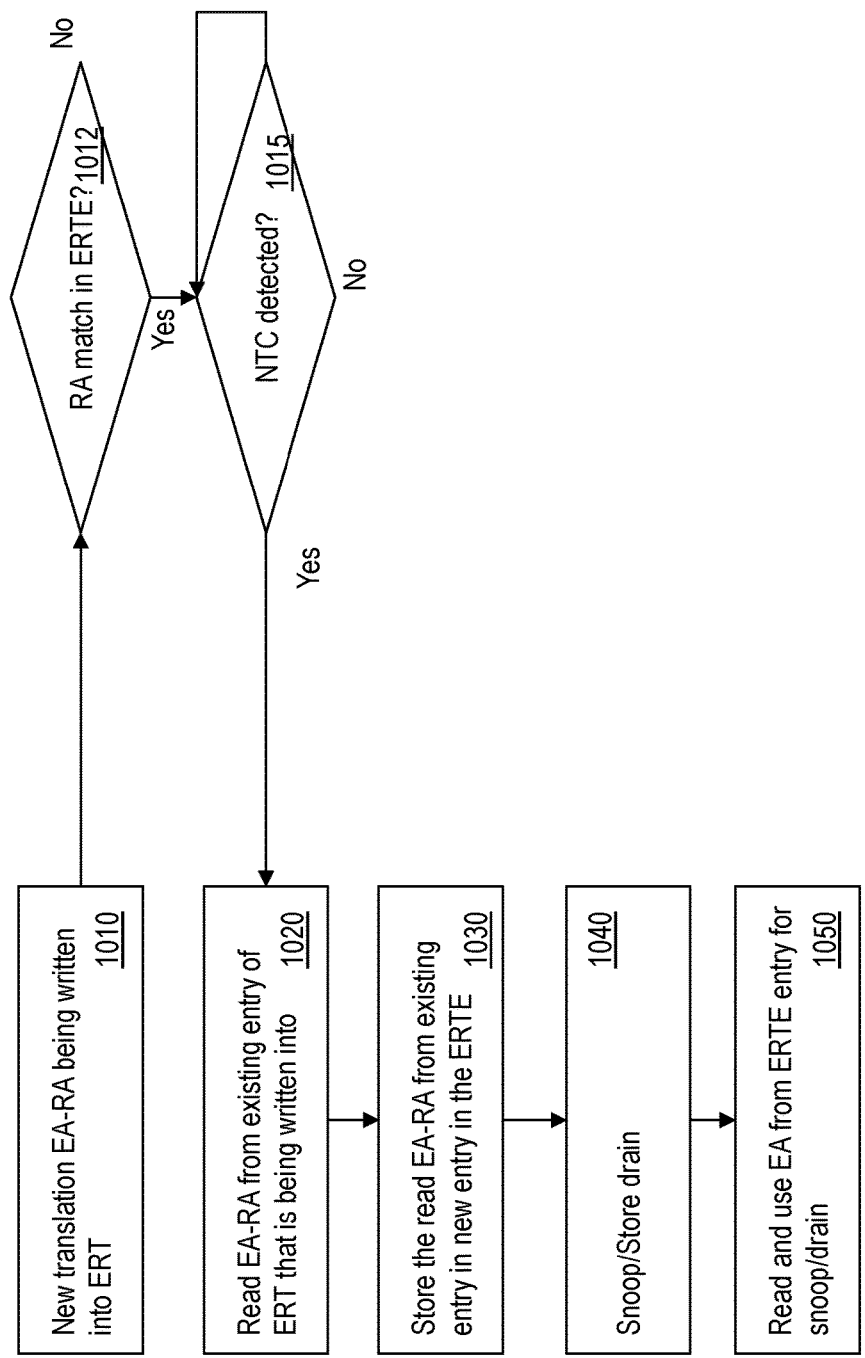
FIG. 11 illustrates a flowchart of an example method for adding entries into the ERTE table according to one or more embodiments of the present invention.

FIG. 11 illustrates a flowchart of an example method for adding entries into the ERTE table 900 according to one or more embodiments of the present invention. As described herein, when a new entry is added into the ERT 255, the LSU writes both EA and RA of a new translation in a given row that may be LRU managed, as shown at 1010. The ERTE table 900 CAMs using the RA to check if the RA already exists in an entry in the ERTE table 900 corresponding to another EA to check for potential case of multi-hit, with same thread at installation, as shown at 1012. If the RA already exists in the ERTE table 900, the ERT table rejects creating the entry for the EA-RA until NTC, and installs when NTC is detected, as shown at 1015.

The LSU reads EA and RA of an existing entry in the ERT that is being overwritten by the new entry before overwriting the entry in the ERT 255, as shown at 1020; and further stores the read-out entry in ERTE table 900, as shown at 1030. Further, when there is a snoop from another core of the processor or a store drain, the ERTE table 900 CAMs and reads EA, as shown at 1040 and 1050.

Figure 12:
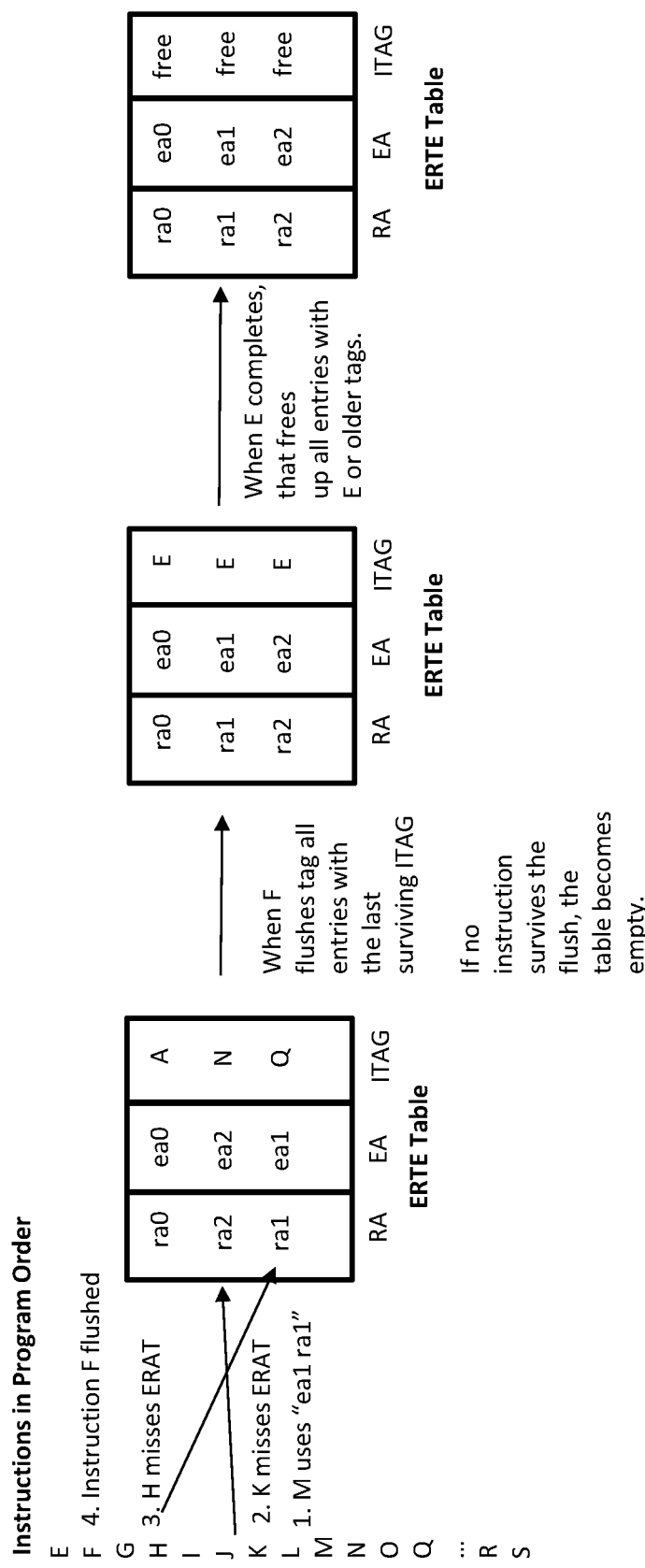
FIG. 12 depicts an example sequence diagram for example set of instructions launched according to one or more embodiments of the present invention.

FIG. 12 depicts an example sequence diagram for example set of instructions launched according to one or more embodiments of the present invention. The instructions are depicted in program order on the left, which are launched OoO, leading to a sequence of operations that is different than the sequence of the instructions. For example, consider that the following events occur in chronological order: 1. Instruction M, issued OoO, used translation "ea1, ra1"; 2. Instruction K, issued OoO, got ERT miss, installed new entry, evicted "ra2 ea2" from ERT. At this time, the last ITAG in use=N (all lines evicted from same thread); that is, instructions up to N, may have used "ra2 ea2" and after N no instruction can used "ra2 ea2". 3. Instruction H, issued OoO, got ERT miss, and evicted "ra1 ea1" from ERT. At this time, last ITAG in use=Q. 4. Flushed pipeline and last instruction survived has ITAG=E; further, next instruction fetched is R, S. 5. Instructions E through R complete in a given cycle, which frees up all entries in ERTE.

The technical solutions described herein thus facilitate using only the EA, providing technical advantages such that an ERAT (which was typically used in processors) is not referred to in a load/store path, and further that detecting SHL and suppressing DVAL in time does not cause timing problems. Further, the technical solutions described herein address technical problems with using only the EA, for example that LHS, SHL, LHL detection can miss when two different EA map to the same RA. The technical solutions described herein address such technical problem by either using a Synonym Detection Table (SDT) or an ERT eviction table for the instructions in the OoO window. The technical solutions provide various technical advantages including reduction in chip area (by not storing RA), reduction in power consumption (by not translating EA-RA), and improvements in latency, among others.

Further, the technical solutions facilitate power consumption savings by eliminating camming for determining RAs for EAs on every load and store address generation. Instead, the EAs are used until an EAD miss and an ERT miss occurs. Further, the technical solutions facilitate removing RA bus switching throughout the unit, as only a single CAM port is now used.

Figure 13:
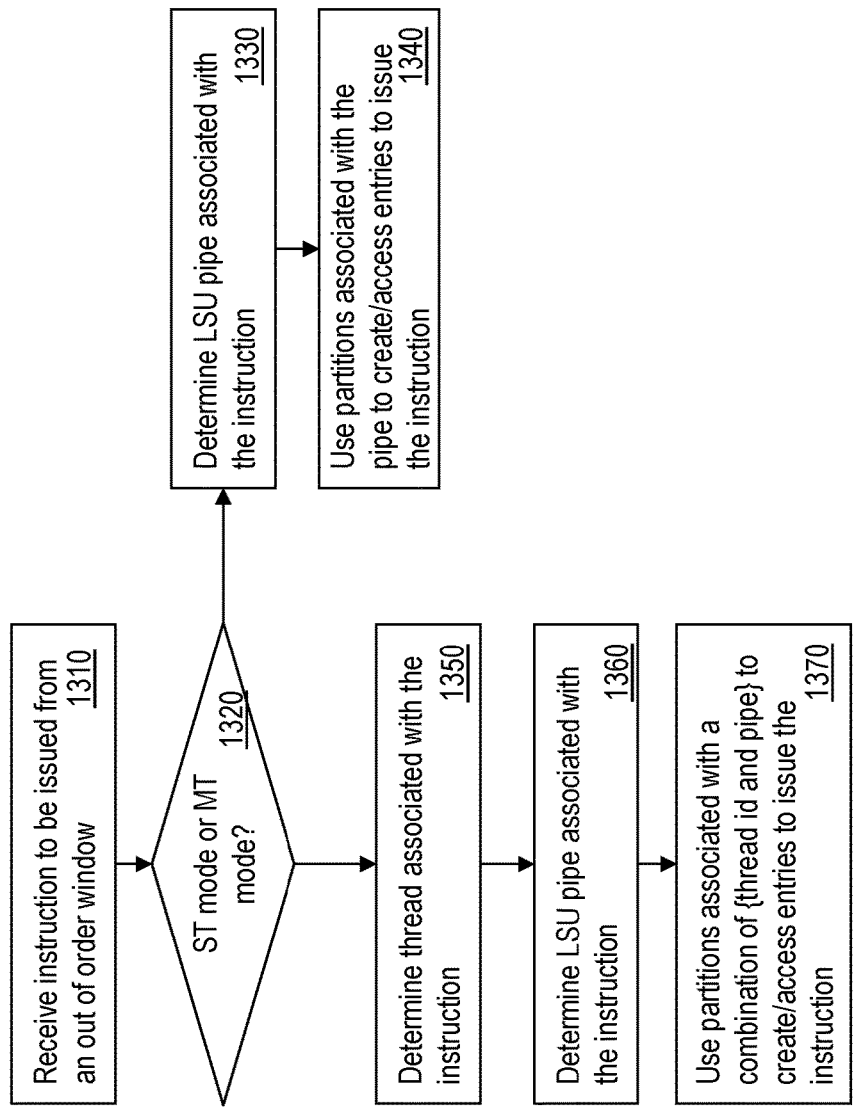
FIG. 13 illustrates a flowchart of an example method for issuing instructions by an LSU in a multi-pipe mode and in an OoO manner depending on whether the processor is operating in single thread (ST) mode or multi-threaded (MT) mode, according to one or more embodiments of the present invention.

FIG. 13 illustrates a flowchart of an example method for issuing instructions by the LSU 104 in a multi-pipe mode and in an OoO manner depending on whether the processor is operating in ST mode or MT mode, according to one or more embodiments of the present invention. For example, the LSU may be operating in a 2-load 2-store mode (multi-pipe mode). The LSU 104 selects an instruction to be issued from the OoO window, as shown at block 1310. The selected instruction may be a load instruction, a store instruction, or any derivative of such instructions that the LSU 104 issues, for example an LARX instruction.

The LSU 104 determines if the OoO processor is operating in ST mode or MT mode, as shown at block 1320. In case the ST mode is being used, the processor is using a single thread, and the LSU 104 only determines the LSU pipe associated with the instruction, as shown at block 1330. For example, if the instruction is a load instruction, the LSU 104 may associate the load instruction with either the LD0 pipe, the LD1 pipe, or any other load pipe. Alternatively, if the instruction is a store instruction, the LSU 104 may associate the store instruction with either the ST0 pipe, the ST1 pipe, or any other store pipe.

Further, the LSU 104 uses partitions in the LRQF 218, SRQR 220, LRQE 222, and ERT 255, associated with the pipe to create/access entries to issue the instruction, as shown at block 1340. For example, if the instruction is a load instruction and the pipe associated is LD0, the instruction uses entries from partitions LRQF0, LRQE0 and ERT0. Similarly, in case of a store instruction on pipe ST0, the partitions SRQR0 and ERT0 are used. In case of LD1 or ST1 pipes, the LRQF1, LRQE1, ERT1, and SRQR1 partitions are used. The entries are created in the partitions based on first in first out basis.

Alternatively, in case the processor is operating in the MT mode, that is simultaneous multiple threads are being executed, the LSU 104 determines a thread identifier of the thread associated with the selected instruction, as shown at block 1350. The LSU 104 further determines the LSU pipe associated with the instruction, as shown at block 1360. Further, the LSU 10 identifies partitions and positions in the partitions of the LRQF 218, SRQR 220, LRQE 222, and ERT 255 to create/access entries to issue the instruction based on a combination of {thread id and pipe}, as shown at block 1370. For example, the LSU limits specific threads to specific pipes, for example, even numbered threads to LD0 and ST0, and odd numbered threads to LD1 and ST1. It should be noted that the categorization of the threads and pipes may be different in other examples. The LD0 and ST0 pipes are associated with the '0' suffixed partitions and the LD1 and ST1 pipes with the '1' sufficed partitions (or vice versa).

In one or more exemplary embodiments of the present invention, each partition is further divided into portions according to a number of threads that the processor is executing in the MT mode. For example, if the processor is executing four threads, the two partitions in the LSU are further divided into two portions each, a first partition for a first thread and a second portion for a second thread, where each partition is associated with a pair of threads. In one or more other exemplary embodiments, where the number of threads in MT mode is different than four, the partitions are divided into different number of portions based on the number of threads associated with each partition. In the above example with a pair of threads being associated with each partition and each partition further divided into equal portions, the first thread from the pair uses the first portion, and the second thread uses the second portion. Thus, an instruction executing on T0 on LD0/ST0 is associated with a first portion of the LRQF0, LRQE0, SRQR0 and ERT0 partitions; and an instruction on T2 on LD0/ST0 is associated with a second portion of the LRQF0, LRQE0, SRQR0 and ERT0 partitions. Further, an instruction executing on T1 on LD1/ST1 is associated with a first portion of the LRQF1, LRQE1, SRQR1 and ERT1 partitions; and an instruction on T3 on LD1/ST1 is associated with a second portion of the LRQF1, LRQE1, SRQR1 and ERT1 partitions.

Figure 14:
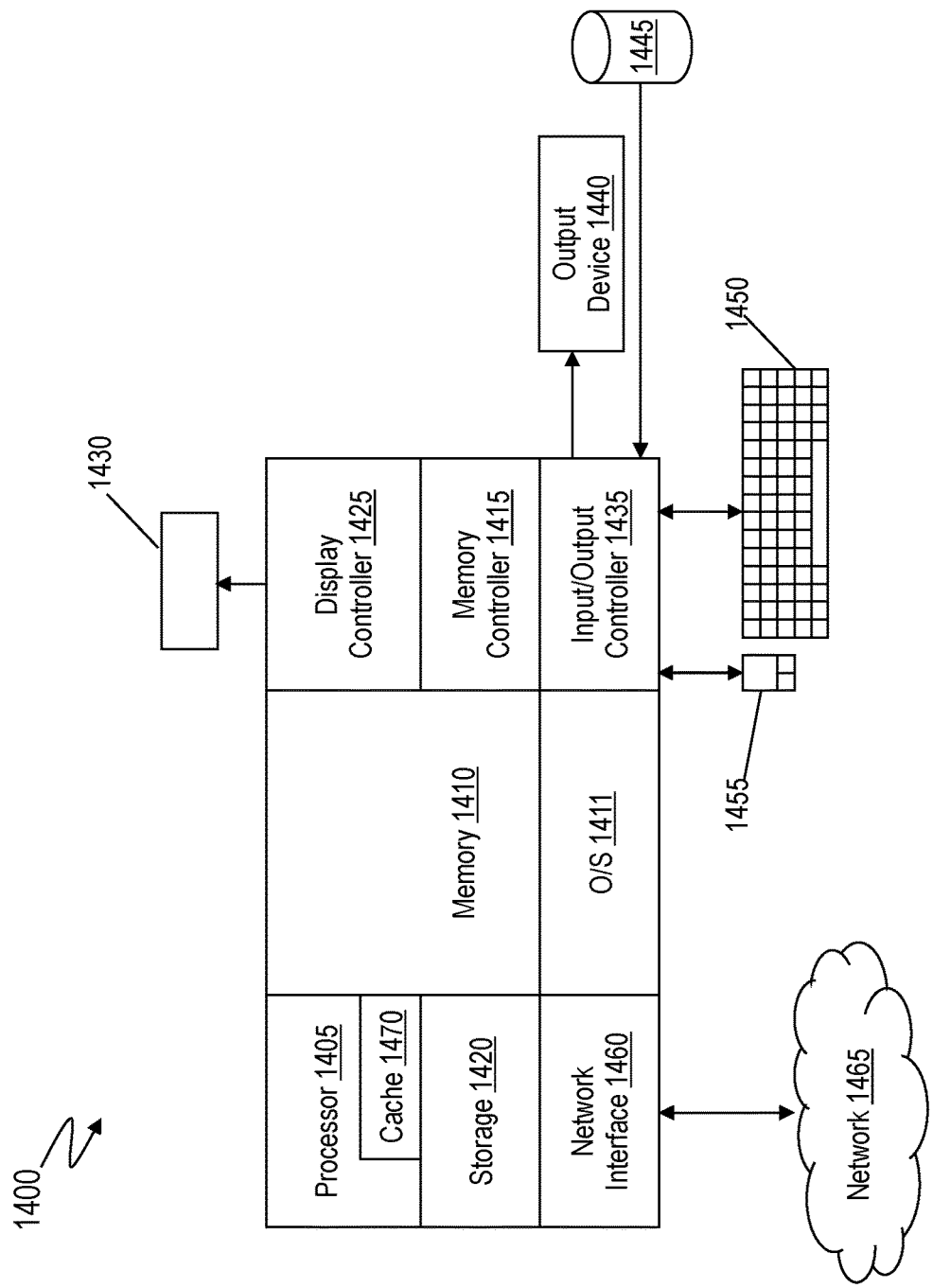
FIG. 14 depicts a block diagram of a computer system for implementing some or all aspects of one or more embodiments of the present invention.

Turning now to FIG. 14, a block diagram of a computer system 1400 for implementing some or all aspects of one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 1400, such as a mobile device, personal computer, workstation, minicomputer, or mainframe computer.

In an exemplary embodiment, as shown in FIG. 14, the computer system 1400 includes a processor 1405, memory 1412 coupled to a memory controller 1415, and one or more input devices 1445 and/or output devices 1447, such as peripherals, that are communicatively coupled via a local I/O controller 1435. These devices 1447 and 1445 may include, for example, a printer, a scanner, a microphone, and the like. A conventional keyboard 1450 and mouse 1455 may be coupled to the I/O controller 1435. The I/O controller 1435 may be, for example, one or more buses or other wired or wireless connections, as are known in the art. The I/O controller 1435 may have additional elements, which are omitted for simplicity, such as controllers, buffers (caches), drivers, repeaters, and receivers, to enable communications.

The I/O devices 1447, 1445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1405 is a hardware device for executing hardware instructions or software, particularly those stored in memory 1412. The processor 1405 may be a custom made or commercially available processor, a central processing unit (CPU), an auxiliary processor among several processors associated with the computer system 1400, a semiconductor based microprocessor (in the form of a microchip or chip set), a microprocessor, or other device for executing instructions. The processor 1405 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 1412 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1412 may incorporate electronic, magnetic, optical, or other types of storage media. Note that the memory 1412 may have a distributed architecture, where various components are situated remote from one another but may be accessed by the processor 1405.

The instructions in memory 1412 may include one or more separate programs, each of which comprises an ordered listing of executable instructions for implementing logical functions. In the example of FIG. 14, the instructions in the memory 1412 include a suitable operating system (OS) 1411. The operating system 1411 essentially may control the execution of other computer programs and provides scheduling, input-output control, file and data management, memory management, and communication control and related services.

Additional data, including, for example, instructions for the processor 1405 or other retrievable information, may be stored in storage 1427, which may be a storage device such as a hard disk drive or solid state drive. The stored instructions in memory 1412 or in storage 1427 may include those enabling the processor 1405 to execute one or more aspects of the dispatch systems and methods of this disclosure.

The computer system 1400 may further include a display controller 1425 coupled to a display 1430. In an exemplary embodiment, the computer system 1400 may further include a network interface 1460 for coupling to a network 1465. The network 1465 may be an IP-based network for communication between the computer system 1400 and an external server, client and the like via a broadband connection. The network 1465 transmits and receives data between the computer system 1400 and external systems. In an exemplary embodiment, the network 1465 may be a managed IP network administered by a service provider. The network 1465 may be implemented in a wireless fashion, e.g., using wireless protocols and technologies, such as WiFi, WiMax, etc. The network 1465 may also be a packet-switched network such as a local area network, wide area network, metropolitan area network, the Internet, or other similar type of network environment. The network 1465 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing a partitioned load request queue and store request queue can be embodied, in whole or in part, in computer program products or in computer systems 1400, such as that illustrated in FIG. 14.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processing unit for executing one or more instructions, the processing unit comprising:
    a load-store unit (LSU) configured to execute a plurality of instructions in an out-of-order (OoO) window using multiple LSU pipes by:
        selecting an instruction from the OoO window, the instruction using a first effective address; and
        in response to the instruction being a load instruction:
            in response to the processing unit operating in a single thread mode, creating an entry in a first partition of a load reorder queue based on the instruction being issued on a first load pipe, and creating the entry in a second partition of the load reorder queue based on the instruction being issued on a second load pipe; and in response to the processing unit operating in a multi-thread mode where multiple threads are processed simultaneously, creating the entry in a first predetermined portion of the first partition of the load reorder queue based on the instruction being issued on the first load pipe and by a first thread of the processing unit, wherein the LSU is configured to:
generate a real address based on the first effective address in the instruction;
in response to detecting that an effective real table (ERT) does not include an entry for the real address, add an entry in the ERT that comprises the real address and at least a portion of the first effective address, wherein at the time of execution of the instruction, the real address from the entry in the ERT is accessed;
in response to detecting that the ERT already includes an entry for the real address with a second effective address: in response to a page size associated with the first effective address being larger than a page size associated with the second effective address, remove said entry for the real address with the second effective address and add a new entry to the ERT for the first effective address, otherwise add an entry to a synonym detection table (SDT) that facilitates resolving cases where two or more different effective addresses map to the same real address, wherein the entry in the SDT includes an identifier of said entry in the ERT, and the at least a portion of the first effective address.

2. The processing unit of claim 1, wherein in the multi-thread mode the first predetermined portion of the first partition of the load reorder queue is specific to load instructions issued by the first thread of the processing unit using the first load pipe.

3. The processing unit of claim 1, the load-store unit further configured to:
in response to the instruction being a store instruction:
in response to the processing unit operating in the single thread mode, creating a store entry in a first partition of a store reorder queue based on the store instruction being issued on a first store pipe, and creating the store entry in a second partition of the store reorder queue based on the store instruction being issued on a second store pipe; and
in response to the processing unit operating in the multi-thread mode, creating the store entry in a first predetermined portion of the first partition of the store reorder queue based on the store instruction being issued on the first store pipe and by the first thread of the processing unit.

4. The processing unit of claim 1, wherein the load reorder queue comprises one partition for each load pipe of the LSU.

5. The processing unit of claim 4, wherein the LSU operates multiple load instructions concurrently, one load instruction using each respective load pipe.

6. The processing unit of claim 1, wherein the store reorder queue comprises one partition for each store pipe of the LSU.

7. The processing unit of claim 6, wherein the LSU operates multiple store instructions concurrently, one store instruction using each respective load pipe.

8. A computer program product comprising a computer readable storage medium having program instructions embodied therewith, the program instructions executable by a processing unit to cause the processing unit to perform operations comprising:
receiving, by a load-store unit (LSU) of the processing unit, an out-of-order window of instructions comprising a plurality of instructions to be executed out-of-order; and
issuing, by the LSU, instructions from the OoO window by:
selecting an instruction from the OoO window, the instruction using a first effective address;
in response to the instruction being a load instruction:
in response to the processing unit operating in a single thread mode, creating an entry in a first partition of a load reorder queue based on the instruction being issued on a first load pipe, and creating the entry in a second partition of the load reorder queue based on the instruction being issued on a second load pipe; and
in response to the processing unit operating in a multi-thread mode, creating the entry in a first predetermined portion of the first partition of the load reorder queue based on the instruction being issued on the first load pipe and by a first thread of the processing unit,
wherein the issuing, by the LSU, instructions further comprises:
generating a real address based on the first effective address in the instruction;
in response to detecting that an effective real table (ERT) does not include an entry for the real address, adding an entry in the ERT that comprises the real address and at least a portion of the first effective address, wherein at the time of execution of the instruction, the real address from the entry in the ERT is accessed;
in response to detecting that the ERT already includes an entry for the real address with a second effective address: in response to a page size associated with the first effective address being larger than a page size associated with the second effective address, remove said entry for the real address with the second effective address and add a new entry to the ERT for the first effective address, otherwise add an entry to a synonym detection table (SDT) that facilitates resolving cases where two or more different effective addresses map to the same real address, wherein the entry in the SDT includes an identifier of said entry in the ERT, and the at least a portion of the first effective address.

9. The computer program product of claim 8, wherein in the multi-thread mode the first predetermined portion of the first partition of the load reorder queue is specific to load instructions issued by the first thread of the processing unit using the first load pipe.

10. The computer program product of claim 8, wherein in response to the instruction being a store instruction:
in response to the processing unit operating in the single thread mode, creating a store entry in a first partition of a store reorder queue based on the store instruction being issued on a first store pipe, and creating the store entry in a second partition of the store reorder queue based on the store instruction being issued on a second store pipe; and in response to the processing unit operating in the multi-thread mode, creating the store entry in a first predetermined portion of the first partition of the store reorder queue based on the store instruction being issued on the first store pipe and by the first thread of the processing unit.

11. The computer program product of claim 8, wherein the load reorder queue comprises one partition for each load pipe of the LSU.

12. The computer program product of claim 11, wherein the LSU operates multiple load instructions concurrently, one load instruction using each respective load pipe.

13. The computer program product of claim 8, wherein the store reorder queue comprises one partition for each store pipe of the LSU, and wherein the LSU operates multiple store instructions concurrently, one store instruction using each respective load pipe.

* * * * *